United States Patent
Li et al.

(10) Patent No.: US 11,368,256 B2
(45) Date of Patent: Jun. 21, 2022

(54) DATA TRANSMISSION METHOD AND APPARATUS

(71) Applicant: Huawei Technologies Co., Ltd., Shenzhen (CN)

(72) Inventors: Yuan Li, Bonn (DE); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 16/698,190

(22) Filed: Nov. 27, 2019

(65) Prior Publication Data
US 2020/0099478 A1  Mar. 26, 2020

Related U.S. Application Data

(63) Continuation of application No. PCT/CN2018/089637, filed on Jun. 1, 2018.

(30) Foreign Application Priority Data

Jun. 2, 2017  (CN) .......................... 201710409942.9

(51) Int. Cl.
*H04L 1/18* (2006.01)
*H04W 72/04* (2009.01)
*H04W 74/08* (2009.01)

(52) U.S. Cl.
CPC .......... *H04L 1/1812* (2013.01); *H04L 1/1835* (2013.01); *H04W 72/042* (2013.01); *H04W 72/0446* (2013.01); *H04W 74/08* (2013.01)

(58) Field of Classification Search
CPC .. H04L 1/1812; H04L 1/1835; H04W 72/042; H04W 72/0446; H04W 74/08
See application file for complete search history.

(56) References Cited

U.S. PATENT DOCUMENTS

| 8,503,316 B2* | 8/2013 | Chen ..................... H04L 1/1822 370/252 |
| 10,560,981 B2* | 2/2020 | Myung ................. H04L 5/0055 |

(Continued)

FOREIGN PATENT DOCUMENTS

| CN | 101079814 A | 11/2007 |
| CN | 101990242 A | 3/2011 |

(Continued)

OTHER PUBLICATIONS

Huawei et al., Discussion on grant-free transmission, Aug. 22, 2016, 3GPP TSG RAN WG1 Meeting #86, R1-166095 (Year: 2016).*

(Continued)

*Primary Examiner* — Eric Nowlin
(74) *Attorney, Agent, or Firm* — Slater Matsil, LLP

(57) ABSTRACT

Embodiments of the present invention provide a method performed by a terminal device, comprising: sending a first data packet to a network device in a first time unit in a GUL transmission manner, where the first data packet corresponds to a first HARQ process number, and the first data packet corresponds to first new data indication information; receiving first instruction information, where the first instruction information is used to instruct the terminal device to send a second data packet in a second time unit, the second data packet corresponds to the first HARQ process number, and the second data packet corresponds to second new data indication information sent by the network device; and performing buffering processing on the first data packet or sending the second data packet, based on a value of the first new data indication information and a value of the second new data indication information.

22 Claims, 12 Drawing Sheets

(56) References Cited

U.S. PATENT DOCUMENTS

| | | | | |
|---|---|---|---|---|
| 2010/0058135 | A1* | 3/2010 | Tseng | H04L 1/1887 |
| | | | | 714/748 |
| 2010/0238823 | A1* | 9/2010 | Chen | H04L 1/1822 |
| | | | | 370/252 |
| 2012/0230245 | A1* | 9/2012 | Ostergaard | H04L 1/1893 |
| | | | | 370/315 |
| 2016/0323854 | A1* | 11/2016 | Gao | H04L 1/1822 |
| 2019/0191486 | A1* | 6/2019 | Myung | H04W 76/27 |
| 2020/0008229 | A1* | 1/2020 | Li | H04L 5/0064 |
| 2020/0014495 | A1* | 1/2020 | Niu | H04L 1/188 |
| 2020/0044768 | A1* | 2/2020 | Yoshimura | H04L 1/1614 |
| 2020/0099478 | A1* | 3/2020 | Li | H04L 1/18 |
| 2020/0107357 | A1* | 4/2020 | Chang | H04W 72/048 |
| 2020/0178273 | A1* | 6/2020 | Lu | H04L 1/1822 |
| 2020/0178288 | A1* | 6/2020 | Chang | H04W 72/0446 |
| 2020/0259601 | A1* | 8/2020 | Zhou | H04L 5/0085 |
| 2020/0260391 | A1* | 8/2020 | Zhou | H04L 1/1819 |
| 2020/0281015 | A1* | 9/2020 | Li | H04W 72/0446 |
| 2020/0344031 | A1* | 10/2020 | Shao | H04L 5/00 |
| 2020/0351026 | A1* | 11/2020 | Babaei | H04L 1/1822 |
| 2020/0383090 | A1* | 12/2020 | Myung | H04L 5/00 |
| 2021/0022160 | A1* | 1/2021 | Li | H04W 72/042 |
| 2021/0029706 | A1* | 1/2021 | Zhou | H04L 5/0044 |
| 2021/0029719 | A1* | 1/2021 | Zhou | H04L 1/1874 |
| 2021/0289488 | A1* | 9/2021 | Cheng | H04L 5/0048 |

FOREIGN PATENT DOCUMENTS

| | | | | |
|---|---|---|---|---|
| CN | 102893679 | A | | 1/2013 |
| CN | 103401667 | A | | 11/2013 |
| CN | 104734821 | A | | 6/2015 |
| CN | 104869653 | A | | 8/2015 |
| CN | 105792359 | A | * | 7/2016 |
| CN | 106068670 | B | * | 9/2019 ........ H04W 72/1236 |
| CN | 110290591 | A | * | 9/2019 ........ H04W 72/1236 |
| EP | 3110195 | A1 | | 12/2016 |
| KR | 20200014495 | A | * | 2/2020 .............. H04N 5/92 |
| WO | WO-2018191870 | A1 | * | 10/2018 |

OTHER PUBLICATIONS

Huawei et al., HARQ timing relationships for grant-free transmission, Aug. 22, 2016, 3GPP TSG RAN WG1 Meeting #86, R1-167206 (Year: 2016).*

Huawei et al., The retransmission and HARQ schemes for grant-free, Oct. 10, 2016, 3GPP TSG RAN WG1 Meeting #86bis, R1-1608859 (Year: 2016).*

Samsung, Support of HARQ in grant-free based multiple access, Oct. 10, 2016, 3GPP TSG RAN WG1 Meeting #86bis, R1-1609039 (Year: 2016).*

Lenovo, Discussion on retransmission design for grant-free based UL transmission, Oct. 10, 2016, 3GPP TSG RAN WG1 Meeting #86bis, R1-1609400 (Year: 2016).*

ZTE, Discussion on grant-free transmission based on sensing, Oct. 10, 2016, 3GPP TSG RAN WG1 Meeting #86bis, R1-1609801 (Year: 2016).*

Nokia et al., Grant-free HARQ for URLLC, Nov. 14, 2016, 3GPP TSG-RAN WG1#87, R1-1612252 (Year: 2016).*

ZTE et al., HARQ for URLLC UL Grant-free transmission, Apr. 3, 2017, 3GPP TSG RAN WG1 Meeting #88bis, R1-1704428 (Year: 2016).*

ZTE et al., HARQ for URLLC UL Grant-free transmission, May 15, 2017, 3GPP TSG RAN WG1 Meeting #89, R1-1707166 (Year: 2017).*

Fujitsu, Discussions on HARQ for grant-free transmission, May 15, 2017, 3GPP TSG RAN WG1 Meeting #89, R1-1707258 (Year: 2017).*

LG Electronics, Discussion on grant-free uplink transmission, May 15, 2017, 3GPP TSG RAN WG1 Meeting #89, R1-1707655 (Year: 2017).*

Guangdong OPPO Mobile Telecom, HARQ for uplink grant-free transmission, May 15, 2017, 3GPP TSG RAN WG1 Meeting #89, R1-1707722 (Year: 2017).*

Nokia et al., UL grant-free HARQ operation for URLLC, May 15, 2017, 3GPP TSG RAN WG1 Meeting #89, R1-1708525 (Year: 2017).*

ZTE, "HARQ for URLLC UL Grant free transmission," 3GPP TSG RAN WG1 Meeting #89, R1-1707166, Hangzhou, P. R. China, May 15-19, 2017, 6 pages.

3rd Generation Partnership Project; Technical Specification Group Radio Access Network; Evolved Universal Terrestrial Radio Access (E-UTRA); Multiplexing and channel coding (Release 14), 3GPP TS 36.212 V14.1.1 (Jan. 2017), 149 pages.

Research in Motion UK Ltd., "Clarification on the Transport Block Size Change in an Adaptive Retransmit Order for UL HARQ," 3GPP TSG-RAN WG2 Meeting #77, R2-120803, Dresden, Germany, Feb. 6-10, 2012, 4 pages.

3rd Generation Partnership Project; Technical Specification Group Radio Access Network; Evolved Universal Terrestrial Radio Access (E-UTRA); Physical layer procedures (Release 14), 3GPP TS 36.213 V14.1.0 (Dec. 2016), 414 pages.

Interdigital Inc, "On Scheduling and HARQ for uplink low latency traffic," 3GPP TSG RAN WG1 Meeting #89, R1-1708353, Hangzhou, R.R. China, May 15-19, 2017, 4 pages.

3rd Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.1.0 (Dec. 2016), 98 pages.

Motorola et al., "Autonomous Uplink HARQ Aspects," 3GPP TSG RAN WG2 Meeting 100, R2-1712979, Reno, NV, USA, Nov. 27-Dec. 1, 2017, 4 pages.

3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.1.0 (Dec. 2016), 653 pages.

VIVO, "HARQ process for UL grant-free transmission", 3GPP TSG-RAN WG2 Meeting #98, R2-1704577, Hangzhou, China, May 15-19, 2017, 3 pages.

* cited by examiner

DATA TRANSMISSION METHOD AND APPARATUS

CROSS-REFERENCE TO RELATED APPLICATIONS

This application is a continuation of International Application No.PCT/CN2018/089637, filed on Jun. 1, 2018, which claims priority to Chinese Patent Application No. 201710409942.9, filed on Jun. 2, 2017. The disclosures of the aforementioned disclosures are hereby incorporated by reference in their entireties.

TECHNICAL FIELD

Embodiments of the present disclosure relate to the communications field, and more specifically, to a data transmission method and apparatus.

BACKGROUND

Currently, a scheduling-free-based grant free uplink (GUL) transmission mechanism, or referred to as an autonomous uplink (AUL) transmission mechanism is known. A network device allocates a GUL resource to a terminal device. When performing uplink transmission, the terminal device does not need to send a scheduling request (SR) to the network device and wait for the network device to send uplink grant (UL Grant) information, and may directly perform uplink transmission by using the GUL transmission resource, thereby reducing a transmission latency.

In a current technology, when uplink transmission is performed by using the GUL transmission mechanism, the terminal device autonomously selects a hybrid automatic repeat request (HARQ) to transmit data (denoted as first data for ease of understanding and distinguishing), and reports, to the network device by using uplink control information (for example, grant free uplink control information), a process number of a HARQ process corresponding to the first data. The network device may obtain the uplink control information in a blind detection manner, to determine the process number of the HARQ process corresponding to the first data, so as to correctly receive the first data.

However, in the current technology, if the blind detection performed by the network device on the uplink control information fails, the network device does not know that the terminal device uses the HARQ process to transmit the first data, and therefore cannot correctly receive the first data. In addition, the network device schedules, in a subsequent time period by using uplink grant UL grant information, the terminal device to perform initial transmission by using the HARQ process (to be specific, instructs the terminal device to send second data different from the first data). After receiving the UL grant information, the terminal device considers that the first data sent by using the HARQ process is correctly received by the network device. In this case, the terminal device no longer sends the first data, but sends the second data on the HARQ process based on the UL grant information. Consequently, the first data is lost, and data transmission reliability is severely affected.

Therefore, a technology needs to be provided to reduce a data packet loss, so as to improve the data transmission reliability.

SUMMARY

Embodiments of the present invention provide a data transmission method and apparatus, to reduce a data packet loss, so as to improve data transmission reliability.

According to a first aspect, a data transmission method is provided. The method includes: sending, by a terminal device, a first data packet to a network device in a first time unit in a grant free uplink (GUL) transmission manner, where the first data packet corresponds to a first hybrid automatic repeat request (HARQ) process number, the first data packet corresponds to first new data indication information, and the first new data indication information is used to indicate whether the first data packet is an initially transmitted data packet or a retransmitted data packet; receiving, by the terminal device, first instruction information sent by the network device, where the first instruction information is used to instruct the terminal device to send a second data packet in a second time unit, the second data packet corresponds to the first HARQ process number, the second time unit is located after the first time unit in terms of time, the second data packet corresponds to second new data indication information sent by the network device, and the second new data indication information is used to indicate whether the second data packet is an initially transmitted data packet or a retransmitted data packet; and performing, by the terminal device, buffering processing on the first data packet or sending the second data packet, based on a value of the first new data indication information and a value of the second new data indication information, where the second data packet is a retransmitted data packet of the first data packet, or the second data packet is an initially transmitted data packet different from the first data packet.

Therefore, according to the data transmission method provided in this embodiment of the present invention, after receiving the first instruction information used to instruct the terminal device to send the second data packet corresponding to the first HARQ process number, the terminal device performs buffering processing on the first data packet or determines a transmission type of the second data packet, based on the value of the second new data indication information corresponding to the second data packet and the value of the first new data indication information corresponding to the first data packet that is sent by the terminal device through GUL transmission, to send the second data packet, where the second data packet is a retransmitted data packet of the first data packet, or the second data packet is an initially transmitted data packet different from the first data packet. Particularly, when the network device does not detect the first data packet, and when the network device instructs, by using the first instruction information, the terminal device to transmit an initially transmitted data packet corresponding to the first HARQ process number, the terminal device no longer transmits the initially transmitted data packet according to the first instruction information, but sends a retransmitted data packet of the first data packet, and no longer clears the first data packet in a buffer, but retains the first data packet in the buffer. Therefore, a loss of the first data packet is reduced, data transmission reliability is improved, and system flexibility is also improved.

With reference to the first aspect, in a first implementation of the first aspect, the performing, by the terminal device, buffering processing on the first data packet or sending the second data packet, based on a value of the first new data indication information and a value of the second new data indication information includes: when the value of the first new data indication information is the same as the value of the second new data indication information, retaining, by the terminal device, the first data packet in a buffer or sending the second data packet, where the second data packet is a retransmitted data packet of the first data packet.

With reference to the first aspect, in a second implementation of the first aspect, the sending, by the terminal device, the second data packet, where the second data packet is a retransmitted data packet of the first data packet, includes: sending, by the terminal device, the second data packet in the second time unit according to the first instruction information.

Therefore, when sending a retransmitted data packet of the first data packet, the terminal device may directly retransmit the first data packet in the second time unit according to instruction of the first instruction information, thereby effectively using current signaling and reducing signaling overheads.

With reference to the first aspect, in a third implementation of the first aspect, the sending, by the terminal device, the second data packet based on a value of the first new data indication information and a value of the second new data indication information includes: sending, by the terminal device, the second data packet in the second time unit according to the first instruction information when the value of the first new data indication information is the same as the value of the second new data indication information and when a transport block size corresponding to the first data packet is the same as a TBS corresponding to the second data packet, where the second data packet is a retransmitted data packet of the first data packet.

Therefore, the terminal device sends the retransmitted data packet of the first data packet in the second time unit according to the first instruction information when the value of the first new data indication information is the same as the value of the second new data indication information and when the transport block size TBS corresponding to the first data packet is the same as the TBS corresponding to the second data packet. Therefore, not only current signaling can be effectively used and signaling overheads are reduced, but also transmission efficiency of the first data packet can be effectively improved and complexity of the terminal device is reduced.

With reference to the first aspect, in a fourth implementation of the first aspect, the method further includes: ignoring, by the terminal device, the first instruction information when the value of the first new data indication information is the same as the value of the second new data indication information.

With reference to the first aspect, in a fifth possible implementation of the first aspect, the method further includes: ignoring, by the terminal device, the first instruction information when the value of the first new data indication information is the same as the value of the second new data indication information and when the transport block size (TBS) corresponding to the first data packet is different from the TBS corresponding to the second data packet.

With reference to the first aspect, in a sixth implementation of the first aspect, the sending, by the terminal device, the second data packet based on a value of the first new data indication information and a value of the second new data indication information includes: sending, by the terminal device, the second data packet in the second time unit according to the first instruction information when the value of the first new data indication information is different from the value of the second new data indication information, where the second data packet is an initially transmitted data packet different from the first data packet.

With reference to the first aspect, in a seventh implementation of the first aspect, the method further includes: determining, by the terminal device, the value of the first new data indication information based on a transmission relationship between a third data packet and the first data packet and a value of third new data indication information corresponding to the third data packet, where the transmission relationship includes: the third data packet being an initially transmitted data packet different from the first data packet, or the third data packet being a retransmitted data packet of the first data packet, the third new data indication information is used to indicate whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in terms of time.

With reference to the first aspect, in an eighth implementation of the first aspect, the determining, by the terminal device, the value of the first new data indication information based on a transmission relationship between a third data packet and the first data packet and a value of third new data indication information corresponding to the third data packet includes: determining, by the terminal device when the first data packet is a retransmitted data packet of the third data packet, that the value of the first new data indication information is the same as the value of the third new data indication information; or determining, by the terminal device when the first data packet is an initially transmitted data packet different from the third data packet, that the value of the first new data indication information is different from the value of the third new data indication information.

With reference to the first aspect, in a ninth implementation of the first aspect, before the sending, by a terminal device, a first data packet to a network device in a first time unit in a grant free uplink (GUL) transmission manner, the method further includes: receiving, by the terminal device, control information sent by the network device, where the control information includes fourth new data indication information, and a value of the fourth new data indication information is a first preset value when the control information is used to activate or reactivate the terminal device to send information in the GUL transmission manner; and determining, by the terminal device based on the control information, a semi-persistent time domain resource corresponding to the GUL transmission manner, where the first time unit belongs to the semi-persistent time domain resource.

With reference to the first aspect, in a tenth implementation of the first aspect, the value of the fourth new data indication information is a second preset value when the control information is used to schedule a retransmitted data packet of a fourth data packet, the fourth data packet is a data packet sent by the terminal device in the GUL transmission manner, and the second preset value is different from the first preset value.

With reference to the first aspect, in an eleventh implementation of the first aspect, the method further includes: sending, by the terminal device, the first new data indication information to the network device.

According to a second aspect, a data transmission method is provided. The method includes: sending, by a network device, first instruction information to a terminal device, where the first instruction information is used to instruct the terminal device to send a second data packet in a second time unit, the second data packet corresponds to a first HARQ process number, the second data packet corresponds to second new data indication information sent by the network device, the second new data indication information is used to indicate whether the second data packet is an initially transmitted data packet or a retransmitted data packet, the first HARQ process number further corresponds to a first data packet, the first data packet is sent by the terminal device to the network device in a first time unit in a GUL transmission manner, the first data packet corresponds to first new data indication information, the first new data indication information is used to indicate whether the first data packet is an initially transmitted data packet or a retransmitted data packet, and the second time unit is located after the first time unit in terms of time; and receiving, by the network device, the second data packet sent by the terminal device, where the second data packet is a retransmitted data packet of the first data packet, or the second data packet is an initially transmitted data packet different from the first data packet.

Therefore, according to the data transmission method in this embodiment of the present invention, after the network device sends the first instruction information used to instruct the terminal device to send the second data packet corresponding to the first HARQ process number, the terminal device may be enabled to: perform buffering processing on the first data packet or determine a transmission type of the second data packet, based on a value of the second new data indication information corresponding to the second data packet and a value of the first new data indication information corresponding to the first data packet that is sent by the terminal device through GUL transmission, to send the second data packet, where the second data packet is a retransmitted data packet of the first data packet, or the second data packet is an initially transmitted data packet different from the first data packet. Particularly, when the network device does not detect the first data packet, and when the network device instructs, by using the first instruction information, the terminal device to transmit an initially transmitted data packet corresponding to the first HARQ process number, the terminal device may be enabled to: no longer transmit the initially transmitted data packet according to the first instruction information, but send the retransmitted data packet of the first data packet, and no longer clear the first data packet in a buffer, but retain the first data packet in the buffer. Therefore, a loss of the first data packet is reduced, data transmission reliability is improved, and system flexibility is also improved.

With reference to the second aspect, in a first implementation of the second aspect, the second data packet is a retransmitted data packet of the first data packet when a value of the first new data indication information is the same as a value of the second new data indication information.

With reference to the second aspect, in a second implementation of the second aspect, the second data packet is a data packet sent by the terminal device in the second time unit With reference to the second aspect, in a third implementation of the second aspect, when the value of the first new data indication information is the same as the value of the second new data indication information and when a transport block size (TBS) corresponding to the first data packet is the same as a TBS corresponding to the second data packet, the second data packet is a data packet sent by the terminal device in the second time unit.

With reference to the second aspect, in a fourth implementation of the second aspect, the second data packet is an initially transmitted data packet different from the first data packet when the value of the first new data indication information is different from the value of the second new data indication information.

With reference to the second aspect, in a fifth implementation of the second aspect, when the first data packet is a retransmitted data packet of a third data packet, the value of the first new data indication information is the same as a value of third new data indication information corresponding to the third data packet, where the third new data indication information is used to indicate whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in terms of time; or when the first data packet is an initially transmitted data packet different from a third data packet, the value of the first new data indication information is different from a value of third new data indication information corresponding to the third data packet, where the third new data indication information is used to indicate whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in terms of time.

With reference to the second aspect, in a sixth implementation of the second aspect, the network device determines the second new data indication information based on a receiving state of the first data packet and the first new data indication information when the network device detects the first data packet.

With reference to the second aspect, in a seventh implementation of the second aspect, the method further includes: sending, by the network device, control information to the terminal device, where the control information includes fourth new data indication information, a value of the fourth new data indication information is a first preset value when the control information is used to activate or reactivate the terminal device to send information in the GUL transmission manner, and the first time unit belongs to a semi-persistent time domain resource corresponding to the GUL transmission manner.

With reference to the second aspect, in an eighth implementation of the second aspect, the value of the fourth new data indication information is a second preset value when the control information is used to schedule a retransmitted data packet of a fourth data packet, the fourth data packet is a data packet sent by the terminal device in the GUL transmission manner, and the second preset value is different from the first preset value.

With reference to the second aspect, in a ninth implementation of the second aspect, the method further includes: receiving, by the network device, the first new data indication information sent by the terminal device.

According to a third aspect, a data transmission apparatus is provided. The apparatus may be configured to perform operations of the terminal device in the first aspect and any possible implementation of the first aspect. Specifically, the apparatus may include a module or unit configured to perform the operations of the terminal device in the first aspect or any possible implementation of the first aspect.

According to a fourth aspect, a data transmission apparatus is provided. The apparatus may be configured to perform operations of the network device in the second aspect and any possible implementation of the second aspect. Specifically, the apparatus may include a module or unit configured to perform the operations of the network device in the second aspect and any possible implementation of the second aspect.

According to a fifth aspect, a terminal device is provided. The terminal device includes a processor, a transceiver, and a memory. The processor, the transceiver, and the memory communicate with each other by using an internal connection path. The memory is configured to store an instruction, and the processor is configured to execute the instruction stored in the memory. When the processor executes the instruction stored in the memory, the execution enables the terminal device to perform the method in the first aspect or any possible implementation of the first aspect, or the execution enables the terminal device to implement the apparatus provided in the third aspect.

According to a sixth aspect, a network device is provided. The network device includes a processor, a transceiver, and a memory. The processor, the transceiver, and the memory communicate with each other by using an internal connection path. The memory is configured to store an instruction, and the processor is configured to execute the instruction stored in the memory. When the processor executes the instruction stored in the memory, the execution enables the network device to perform the method in the second aspect or any possible implementation of the second aspect, or the execution enables the network device to implement the apparatus provided in the fourth aspect.

According to a seventh aspect, a computer-readable storage medium is provided. The computer-readable storage medium is configured to store a computer program, and the computer program includes an instruction used to perform the method in the first aspect and any possible implementation of the first aspect.

According to an eighth aspect, a computer-readable storage medium is provided. The computer-readable storage medium is configured to store a computer program, and the computer program includes an instruction used to perform the method in the second aspect and any possible implementation of the second aspect.

In some of the foregoing implementations, the value of the second new data indication information is different from the value of the first new data indication information when the network device detects the first data packet and successfully receives the first data packet; or the value of the second new data indication information is the same as the value of the first new data indication information when the network device does not detect the first data packet, or when the network device detects the first data packet and does not successfully receive the first data packet.

In some of the foregoing implementations, before the sending, by a terminal device, a first data packet to a network device in a first time unit in a grant free uplink GUL transmission manner, the method further includes: receiving, by the terminal device, control information sent by the network device, where the control information includes fourth new data indication information, and a value of the fourth new data indication information is a first preset value when the control information is used to activate or reactivate the terminal device to send information in the GUL transmission manner; and ignoring, by the terminal device, the fourth new data indication information when the terminal device determines the first new data indication information.

In some of the foregoing implementations, the second data packet is a next data packet or a latest data packet that the network device schedules the terminal device to send after the first time unit and that corresponds to the first HARQ process number.

In some of the foregoing implementations, the third data packet is a previous data packet or a latest data packet that the network device schedules the terminal device to send before the first time unit and that corresponds to the first HARQ process number.

DETAILED DESCRIPTION OF ILLUSTRATIVE EMBODIMENTS

Figure 1:
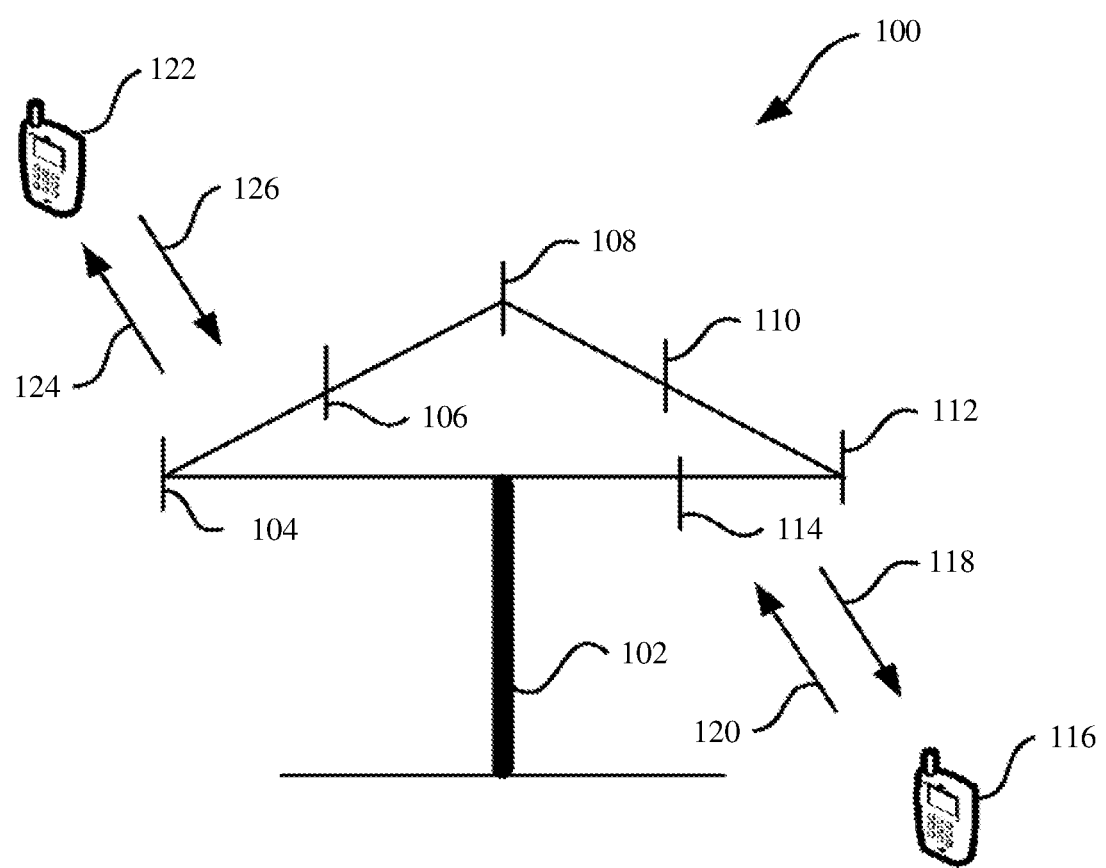
FIG. 1 is a schematic diagram of a data transmission communications system to which an embodiment of the present invention is applied.

The following describes technical solutions in embodiments of the present invention with reference to the accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using, for example, a local and/or remote process and based on a signal having one or more data packets (for example, data from two components interacting with another component in a local system, a distributed system, and/or across a network such as the Internet interacting with other systems by using the signal).

It should be understood that, the embodiments of the present invention may be applied to various communications systems, for example, systems such as a global system for mobile communications (GSM), a wideband code division multiple access (WCDMA) system, and an LTE system, and supported communication is mainly voice and data communication. Usually, a conventional base station supports a limited quantity of connections, and is easy to implement.

A next-generation mobile communications system makes future mobile data traffic growth, a massive Internet of Things, diversified new services, and diversified application scenarios possible. In addition to serving as a universal connection framework, basic 5th Generation (5G) new radio (NR) of a new-generation cellular network is expected to improve a data speed, a capacity, reliability, efficiency, and coverage, and reduce a latency to a brand new level, and fully use each bit of available spectrum resource. Moreover, 5G based on an orthogonal frequency division multiplexing (OFDM) new radio design becomes a global standard, not only supports a 5G device and diversified deployment and covers diversified spectrums (including covering low and high bands), but also needs to support diversified services and terminals.

The embodiments of the present invention are described with reference to a terminal device. The terminal device may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a wireless local area network (WLAN), a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal device in a future 5G network, or a terminal device in a future evolved PLMN network, or the like.

In addition, the embodiments of the present invention are described with reference to a network device. The network device may be a device configured to communicate with a mobile device. The network device may be an access point (AP) in a WLAN or a base transceiver station (BTS) in GSM or Code Division Multiple Access (CDMA); or may be a NodeB (NB) in WCDMA; or may be an evolved NodeB (eNB or eNodeB) in LTE, or a relay station or an access point, or a vehicle-mounted device, a wearable device, a network device in a future 5G network, a network device in a future evolved PLMN network, or the like.

A method and an apparatus provided in the embodiments of the present invention may be applied to a terminal device or a network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in the embodiments of the present invention, a specific structure of an execution body of a control information transmission method is not specifically limited in the embodiments of the present invention, provided that communication can be performed based on the control information transmission method in the embodiments of the present invention by running a program that records code of the control information transmission method in the embodiments of the present invention. For example, a wireless communication method in the embodiments of the present invention may be performed by a terminal device or a network device, or a functional module that is in a terminal device or a network device and that can invoke and execute a program.

In addition, aspects or features of the embodiments of the present invention may be implemented as a method, an apparatus, or a product that uses standard programming and/or engineering technologies. The terminology "product" used in the embodiments of the present invention covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The terminology "machine-readable media" may include but is not limited to a radio channel, and various other media that can store, contain, and/or carry an instruction and/or data.

FIG. 1 is a schematic diagram of a data transmission communications system to which an embodiment of the present invention is applied. As shown in FIG. 1, the communications system wo includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. For example, the terminal devices 116 and 122 may be a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different bands, and the forward link 124 and the reverse link 126 may use different bands.

For another example, in a time division duplex (TDD) system and a full duplex system, the forward link 118 and the reverse link 120 may use a same band, and the forward link 124 and the reverse link 126 may use a same band.

Each antenna (or an antenna group including a plurality of antennas) and/or an area designed for communication are/is referred to as a sector of the network device 102. For example, the antenna group may be designed to communicate with a terminal device in a sector within coverage of the network device 102. In a procedure in which the network device 102 separately communicates with the terminal devices 116 and 122 by using the forward links 118 and 124, a transmit antenna of the network device 102 may improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly scattered within related coverage, less interference is caused to a mobile device in a neighboring cell.

At a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain (for example, generate, receive from another communications apparatus, or store in a memory) a specific quantity of data bits that are to be sent to the wireless communications receiving apparatus by using a channel. The data bits may be included in a transport block (or a plurality of transport blocks) of data, and the transport block may be segmented to generate a plurality of code blocks.

In addition, the communications system 100 may be a public land mobile network (PLMN), a D2D network, an M2M network, or another network. FIG. 1 is only an example of a simplified schematic diagram. The network may further include another network device not shown in FIG. 1.

A time-frequency resource used in the communications system 100 for wireless communication is described in detail below.

In this embodiment of the present invention, time domain resources used by the network device and the terminal device to transmit information may be divided into a plurality of time units in time domain.

In addition, in this embodiment of the present invention, the plurality of time units may be consecutive, or a preset interval is set between some adjacent time units. This is not specially limited in this embodiment of the present invention.

In this embodiment of the present invention, the time unit may include a time unit used to transmit uplink information (for example, uplink data) and/or downlink information (for example, downlink data).

In this embodiment of the present invention, a length of one time unit may be randomly set. This is not specially limited in this embodiment of the present invention.

For example, one time unit may include one or more subframes.

Alternatively, one time unit may include one or more slots.

Alternatively, one time unit may include one or more symbols.

Alternatively, one time unit may include one or more TTIs.

Alternatively, one time unit may include one or more short transmission time intervals (sTTI).

In this embodiment of the present invention, the time-frequency resource used in the communications system 100 for wireless communication may be divided into a plurality of TTIs in time domain. A TTI is a commonly used parameter in a current communications system (for example, an LTE system), and is a scheduling unit for scheduling information transmission on a radio link. In the prior art, it is usually considered that 1 TTI=1 ms. In other words, one TTI is one subframe or two slots. The TTI is a basic time unit in radio resource management (such as scheduling).

In a communications network, a latency is a key performance indicator, and affects user experience. With development of a communications protocol, a physical layer scheduling interval that most significantly affects the latency becomes smaller. A scheduling interval in earlier WCDMA is 10 ms, a scheduling interval in high-speed packet access (HSPA) is shortened to 2 ms, and a scheduling interval (that is, a TTI) in long term evolution (LTE) is shortened to 1 ms.

Due to a low-latency service requirement, a shorter TTI frame structure needs to be introduced at a physical layer to further shorten the scheduling interval and improve user experience. For example, a TTI length in the LTE system may be shortened from 1 ms to a range of 1 symbol to 1 slot (including 7 symbols). The foregoing symbol may be an orthogonal frequency division multiplexing (OFDM) symbol or a single carrier-frequency division multiple access (SC-FDMA) symbol in the LTE system, or may be a symbol in another communications system. For another example, a TTI length in a 5G communications system is also less than 1 ms.

In data transmission based on a TTI whose length is 1 ms in the LTE system, a round-trip time (RTT) of data transmission is usually 8 ms. It is assumed that, in comparison with existing scheduling based on the TTI whose length is 1 ms, a processing time is shortened proportionally, to be specific, still complying with an existing RTT latency. During data transmission based on an sTTI whose length is 0.5 ms, an RTT of the data transmission is 4 ms. A latency can be half reduced than a latency in the data transmission based on the TTI whose length is 1 ms. Therefore, user experience is improved.

A TTI whose length is less than 1 ms may be referred to as an sTTI. For example, in the LTE system, lengths of sTTIs may have a same length that is any one of one symbol to seven symbols, or lengths of sTTIs may be a combination of at least two different lengths of one symbol to seven symbols. For example, 1 ms includes six sTTIs, and lengths of the sTTIs may be respectively three symbols, two symbols, two symbols, two symbols, two symbols, and three symbols. Alternatively, 1 ms includes four sTTIs, and lengths of the sTTIs may be respectively three symbols, four symbols, three symbols, and four symbols, or may be a combination of other different lengths.

In addition, an uplink sTTI length may be the same as a downlink sTTI length. For example, the uplink sTTI length and the downlink sTTI length are each two symbols.

Alternatively, an uplink sTTI length may be greater than a downlink sTTI length. For example, the uplink sTTI length is seven symbols, and the downlink sTTI length is two symbols.

Alternatively, an uplink sTTI length may be less than a downlink sTTI length. For example, the uplink sTTI length is four symbols, and the downlink sTTI length is one subframe.

A data packet whose TTI length is less than one subframe or 1 ms is referred to as a short TTI data packet. Short TTI data transmission may be performed contiguously or inconsecutively in frequency domain. It should be noted that in consideration of backward compatibility, both data transmission based on a TTI whose length is 1 ms and data transmission based on an sTTI may coexist in a system.

In this embodiment of the present invention, a TTI (for example, a TTI whose length is 1 ms or longer than 1 ms)

and an sTTI that are specified in the prior art (for example, the LTE system) may be collectively referred to as a TTI. In addition, in this embodiment of the present invention, a length of a TTI may be changed based on an actual requirement.

It should be understood that the foregoing listed structure of the time unit is only an example for description, and is not specifically limited in this embodiment of the present invention. A structure of the time unit may be randomly changed based on an actual requirement. For example, for an LTE system that does not support the sTTI, one time unit may be one subframe. For another example, for an LTE system that supports the sTTI, one time unit may include one sTTI, one time unit may include one slot, one time unit may include one or more (for example, a positive integer quantity of less than 7 or a positive integer quantity of less than 6) symbols, or one time unit may be one subframe.

It should be understood that when one time unit includes at least one symbol, any one of the at least one symbol may be a complete symbol or may be a part of a symbol. The part of the symbol means that some time domain resources of the symbol are occupied by a device to send information, but a remaining part of the symbol is not used to send information, in other words, is reserved as idle.

It should be noted that, in this embodiment of the present invention, a length, used for information transmission (in other words, information transmission duration), of a time unit may be 1 ms, or may be less than 1 ms.

In this embodiment of the present invention, a frequency domain resource (in other words, a spectrum resource) in a transmission resource used in the communications system 100 may be a licensed resource. In other words, the frequency domain resource in the resource used in the communications system 100 may belong to a licensed band.

Alternatively, in this embodiment of the present invention, a frequency domain resource (in other words, a spectrum resource) in a resource (a transmission resource or a time-frequency resource) used in the communications system 100 may belong to an unlicensed band (in other words, an unlicensed resource).

The unlicensed resource may be a resource that can be shared by communication devices.

Resource sharing in the unlicensed band means that only limitations on indexes of transmit power, out-of-band leakage, and the like are set for use of a particular spectrum, to ensure that a plurality of devices sharing the band meet a basic coexistence requirement. An operator can implement network capacity offloading by using an unlicensed band resource, but needs to comply with regulatory requirements of different regions and different spectrums on the unlicensed band resource. These requirements are usually formulated to protect a public system such as radar and to ensure that a plurality of systems fairly coexist and cause as little negative impact to each other as possible, and include a transmit power limitation, an out-of-band leakage index, and indoor and outdoor use limitations. In addition, some regions further have some additional coexistence policies and the like. For example, the communications devices can use a time-frequency resource in a contention manner or a listening manner, for example, a manner specified in listen before talk (LBT).

In addition, in this embodiment of the present invention, the communications devices in the communications system 100 may further perform wireless communication by using a licensed spectrum resource. In other words, the communications system 100 in this embodiment of the present invention is a communications system that can use a licensed band.

In this embodiment of the present invention, two transmission manners are used for uplink transmission. To be specific, one is a scheduling-based transmission manner, and the other is a scheduling-free-based transmission manner. The two transmission manners are briefly described below.

Scheduling-Based Uplink Transmission Manner

To be specific, uplink transmission of a terminal device needs to be scheduled by a network device. The scheduling-based uplink transmission (SUL) manner is also referred to as an SUL transmission manner. Specifically, before performing uplink transmission (or transmitting uplink data), the terminal device needs to send a scheduling request (SR) to the network device on a physical uplink control channel (PUCCH). After the network device receives the SR, the network device sends scheduling information (in other words, uplink grant (UL Grant) information) to the terminal device, so that the terminal device performs uplink transmission based on an uplink resource indicated by the scheduling information. Such scheduling-based transmission manner has high reliability, but causes a relatively high transmission latency.

In this embodiment of the present invention, an SUL radio resource that is used to send information in the SUL transmission manner based on scheduling of the network device is also referred to as an SUL physical uplink shared channel (PUSCH), and the SUL PUSCH also includes an sPUSCH corresponding to an sTTI shorter than 1 ms.

Scheduling-Free-Based Uplink Transmission Manner

To be specific, uplink transmission of a terminal device does not need to be scheduled by a network device. Such scheduling-free-based uplink transmission manner may be referred to as a grant free uplink (GUL) transmission manner, or referred to as an autonomous uplink (AUL) transmission manner. Briefly, the network device allocates a GUL resource to the terminal device in a semi-persistent manner. When performing uplink transmission, the terminal device does not need to send a scheduling request SR to the network device and wait for the network device to send UL grant information, and may directly perform uplink transmission by using the GUL resource, thereby reducing a transmission latency.

The following describes the GUL transmission manner in this embodiment of the present invention in detail.

In this embodiment of the present invention, the GUL transmission manner may be that the terminal device transmits data by using a GUL radio resource. The GUL radio resource may be a resource that is allocated by the network device only to the terminal device and is not allocated to another terminal device. Alternatively, because service transmission of the terminal device is unexpected, the terminal device may not occupy the GUL radio resource when there is no uplink service. In this case, to improve resource usage efficiency, the network device may allocate the GUL radio resource to a plurality of terminal devices including the terminal device, so that the plurality of terminal devices share the resource in a statistical multiplexing manner. This is not particularly limited in this embodiment of the present invention. In addition, in this embodiment of the present invention, the GUL radio resource may be allocated to the terminal device by the network device after the network device determines that the terminal device needs to perform uplink transmission. Alternatively, the GUL radio resource may be allocated to the terminal device, for example, when the terminal device accesses a cell served by the network device. Alternatively, the GUL radio resource may be determined in some or all of unlicensed time-frequency resources obtained through contention and allocated to the terminal device, for example, when the network device obtains, through contention, the unlicensed time-frequency resources provided by the communications system. This is not specifically limited in this embodiment of this application.

The GUL radio resource is a subset of all available GUL radio resources allocated by the network device to the terminal device or activated by the network device. The available GUL radio resources correspond to available GUL time domain resources and available GUL frequency domain resources. The available GUL time domain resources are persistent. Specifically, the available GUL time domain resources are periodic, and each GUL period includes at least one time unit. For example, 4 ms is used as a period. First 2 ms in each period is the available GUL time domain resource, including subframes {#1, #2}, {#5, #6}, {#9, #10} and the like. For any time unit in the available GUL time domain resources, the terminal device may send uplink data in the time unit, or may not send uplink data in the time unit, in other words, not occupy the time unit. For example, when the terminal device has no uplink service, or fails to perform LBT before a time unit in the GUL time domain radio resources, the terminal device may skip (skip) the time unit without sending uplink data. Alternatively, the terminal device may not occupy any time unit in a GUL period to send uplink data in the GUL period, in other words, skips the GUL period. A frequency domain resource corresponding to the GUL radio resource is also included in the available GUL frequency domain resources, and may be equal to or less than an available GUL frequency domain resource corresponding to a first time unit. This is not limited herein.

The GUL radio resource is a resource for transmitting uplink data (UL-Shared CHannel, UL-SCH). More specifically, the GUL radio resource may be a physical uplink data channel (PUSCH) resource, and the GUL radio resource is also referred to as a GUL PUSCH. The GUL PUSCH also includes an sPUSCH (short PUSCH) corresponding to an sTTI shorter than 1 ms.

As described above, the available GUL radio resources are periodic, so that the network device may configure a period of the available GUL radio resources by using higher layer signaling. In other words, the GUL PUSCH is determined based on the high layer signaling. In contrast, an SUL PUSCH is scheduled by the network device based on dynamic signaling of the network device in the PDCCH.

In addition, configuring the GUL PUSCH by the network device does not need the terminal device to report an SR. In contrast, the SUL PUSCH scheduled by the network device is indicated to the terminal device by the network device only after the network device receives the SR sent by the terminal device.

In addition, compared with the available GUL resources that are periodic persistent resources, the SUL PUSCH scheduled by the network device takes effect only once, and a scheduled PUSCH corresponds to a limited quantity of time units in a limited time range, and does not continuously take effect.

In addition, in this embodiment of the present invention, by way of example rather than limitation, the network device may send, to the terminal device, related signaling (for example, higher layer signaling and/or dynamic signaling in a PDCCH) used to configure the GUL radio resource, so that the terminal device can determine the GUL radio resource. Specifically, the terminal device may determine the at least one time unit included in the GUL radio resource in time domain. Further, the terminal device may determine a total quantity and a location of the at least one time unit.

In addition, in the GUL transmission manner in this embodiment of the present invention, the terminal device carries grant free uplink control information (G-UCI) to report related information of uplink data sent in the GUL transmission manner, where the G-UCI is control information corresponding to the uplink data. The G-UCI includes at least one piece of information in information about a HARQ process number of a HARQ process corresponding to the uplink data, information about a new data indicator (NDI), information about a redundancy version (RV) corresponding to the uplink data, and information about a user identifier (denoted as UE ID) of the terminal device. To obtain the uplink data, the network device needs to first obtain the G-UCI, and then demodulate and decode the GUL PUSCH based on the G-UCI, to obtain the uplink data. In contrast, for the PUSCH scheduled by the network device, because the foregoing control information is included in a scheduling information dynamic UL grant, the terminal device does not need to carry the information during uplink transmission.

In an existing communications system, the foregoing two transmission manners may be used in combination, or may be used separately. This is not limited in this embodiment of the present invention.

A data packet in the embodiments of the present invention may have a plurality of explanations. The data packet may be a bit sequence on which coding and modulation processing is not performed, that is, a transport block (TB) or a media access control (MAC) protocol data unit (PDU). Alternatively, the data packet may be a bit sequence (which may also be understood as a data signal) on which coding and modulation processing is performed.

Figure 2:
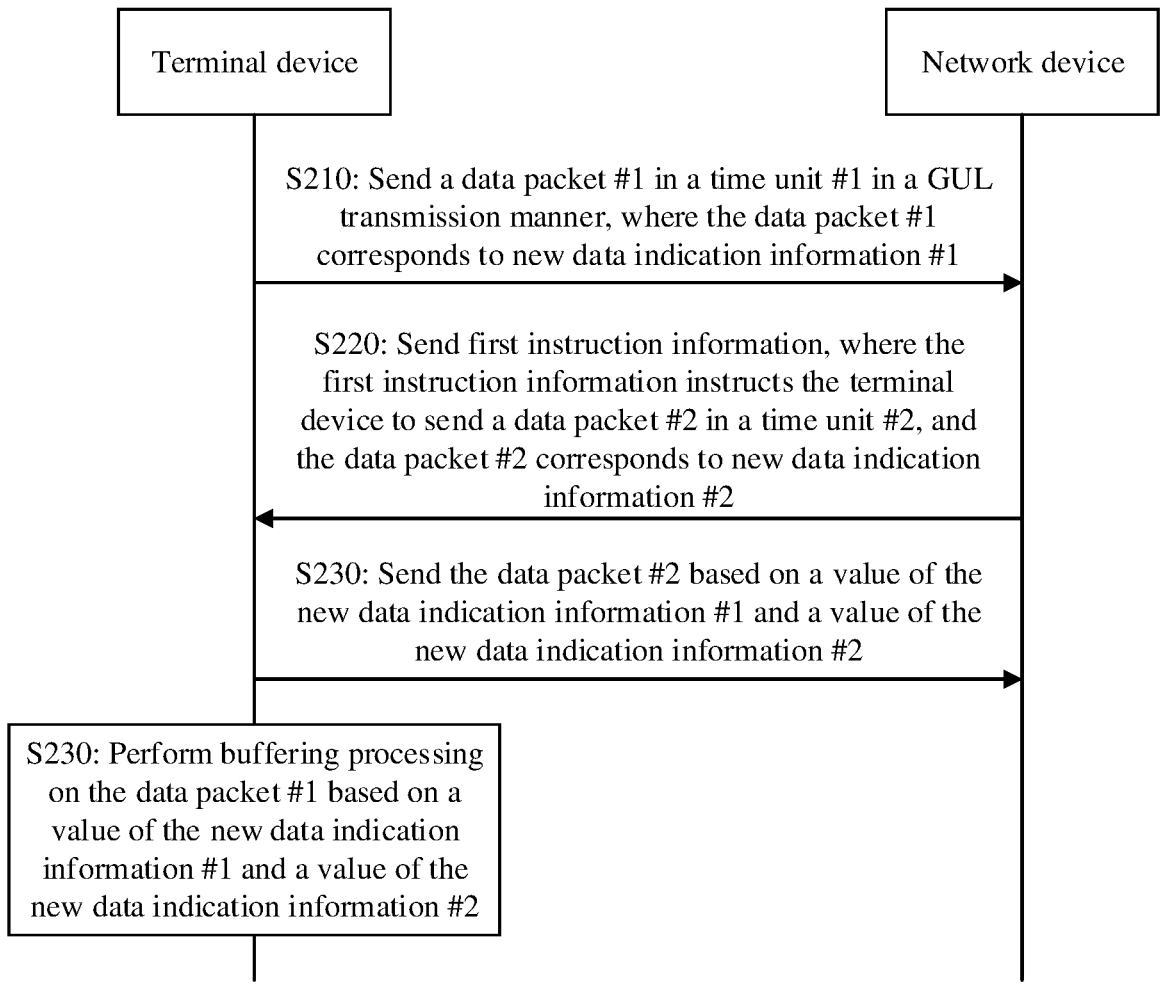
FIG. 2 is a schematic interaction diagram of a data transmission method according to an embodiment of the present invention.

The following describes in detail a data transmission method according to the embodiments of the present invention with reference to FIG. 2 to FIG. 12. FIG. 2 is a schematic interaction diagram of a data transmission method according to an embodiment of the present invention.

In S210, a terminal device sends a first data packet to a network device in a first time unit in a grant free uplink GUL transmission manner, where the first data packet corresponds to a first hybrid automatic repeat request HARQ process number, the first data packet corresponds to first new data indication information, and the first new data indication information is used to indicate whether the first data packet is an initially transmitted data packet or a retransmitted data packet.

Specifically, as described above, when sending a data packet #1 (namely, an example of the first data packet), the terminal device does not need to send a scheduling request SR to the network device and wait for the network device to send UL grant information, and may directly perform uplink transmission by using a GUL resource, thereby reducing a transmission latency. Specific related descriptions of the GUL transmission manner are already described in detail in the foregoing. Details are not described herein again.

New data indication information #1 (namely, an example of the first new data indication information) corresponds to the data packet #1. In other words, the new data indication information #1 is used to indicate whether the data packet #1 is an initially transmitted data packet or a retransmitted data packet. A size of the new data indication information #1 may be one bit, and a value of the new data indication information #1 corresponds to two states: "0" and "1", which are respectively used to indicate that the data packet #1 is an initially transmitted data packet or a retransmitted data packet.

It should be noted that the new data indication information #1 is used to indicate whether the data packet #1 is an initially transmitted data packet or a retransmitted data packet. A receive end (for the new data indication information #1, the receive end is the network device) cannot determine, only based on the new data indication information #1, whether the data packet #1 is an initially transmitted data packet or a retransmitted data packet, but the receive end further needs to determine, based on a value of new data indication information corresponding to a previous data packet that is of the data packet #1 and that corresponds to the same HARQ process number (that is, the first HARQ process number), whether the data packet #1 is an initially transmitted data packet or a retransmitted data packet, where the previous data packet that is of the data packet #1 and that corresponds to the first HARQ process number is a data packet sent before a time unit #1 (namely, an example of the first time unit). Alternatively, it may also be understood as that, for the receive end, the new data indication information #1 is only one of factors used to determine whether the data packet #1 is an initially transmitted data packet or a retransmitted data packet, and the receive end further needs to determine, with reference to other information, whether the data packet #1 is an initially transmitted data packet or a retransmitted data packet.

For example, if the value of the new data indication information corresponding to the previous data packet that is of the data packet #1 and that corresponds to the first HARQ process number is "0", and the value of the new data indication information #1 is "1", the receive end (in other words, the network device) needs to compare the values of the two pieces of new data indication information, to determine whether the data packet #1 is an initially transmitted data packet or a retransmitted data packet. More specifically, if the values of the two pieces of new data indication information are different, the receive end (in other words, the network device) determines that the data packet #1 is an initially transmitted data packet; or if the values of the two pieces of new data indication information are the same, the receive end (in other words, the network device) determines that the data packet #1 is a retransmitted data packet. Explanations for various new data indication information in the following, such as second new data indication information, third new data indication information, and fourth new data indication information are the same as the explanations for the first new data indication information herein. For brevity, details are not described subsequently.

Specifically, the new data indication information #1 is NDI information. More specifically, the new data indication information #1 is an NDI field in G-UCI reported by the terminal device to the network device.

In this embodiment of the present invention, there may be a plurality of explanations for "the data packet #1 is an initially transmitted data packet or a retransmitted data packet". Specific explanations are as follows.

If the data packet #1 is a bit sequence on which coding and modulation processing is performed, that the data packet #1 indicated by the new data indication information #1 is an initially transmitted data packet or a retransmitted data packet means that the data packet #1 is a retransmitted data packet or an initially transmitted data packet of a transport block #1; or the data packet #1 is retransmission or initial transmission of the transport block #1, where the transport block #1 is a bit sequence (in other words, an original information element) on which coding and modulation processing is not performed. Specifically, the transport block #1 is a transport block that corresponds to another previous data packet (denoted as a data packet #3 for ease of distinguishing and understanding) of the data packet #1 and on which coding and modulation processing is not performed. To be specific, the data packet #3 is a bit sequence obtained after coding and modulation processing is performed on the transport block #1. When the data packet #1 is a retransmitted data packet of the data packet #3, the data packet #1 is different from the data packet #3, but the data packet #1 and the data packet #3 correspond to a same uncoded transport block, that is, the transport block #1. When the data packet #1 is an initially transmitted data packet different from the data packet #3, the data packet #1 is different from the data packet #3, the data packet #1 and the data packet #3 correspond to different uncoded transport blocks, and the data packet #1 corresponds to a transport block different from the transport block #1.

The data packet #3 also corresponds to the first HARQ process number, and a time unit used to carry the data packet #3 is located before the time unit #1 in terms of time. Compared with the data packet #1, the data packet #3 may be a latest previous data packet corresponding to the first HARQ process number, or the data packet #3 may be spaced apart from the data packet #1 by at least one data packet corresponding to the same HARQ process number. The data packet #1, the data packet #3, and the at least one data packet between the data packet #1 and the data packet #3 all correspond to the first HARQ process number.

If the data packet #1 is a bit sequence on which coding and modulation are not performed, that the data packet #1 indicated by the new data indication information is an initially transmitted data packet or a retransmitted data packet means that the data packet #1 is an initially transmitted data packet or a retransmitted data packet of the data packet #3. Specifically, when the data packet #1 is a retransmitted data packet of the data packet #3, the data packet #1 and the data packet #3 are a same data packet. When the data packet #1 is an initially transmitted data packet different from the data packet #3, the data packet #1 is a new data packet different from the data packet #3.

Similarly, explanations for an initially transmitted data packet or a retransmitted data packet of another data packet (a second data packet, a third data packet, or a fourth data packet) described in the following are the same as the explanations for "the data packet #1 is an initially transmitted data packet or a retransmitted data packet" herein. For brevity, details are not described again subsequently.

When the terminal device sends the data packet #1 to the network device in the GUL transmission manner, as described above, based on a property of the GUL transmission manner, the network device does not know that the terminal device sends the data packet #1, and the terminal device may send G-UCI corresponding to the data packet #1 to report related information of the data packet #1 sent in the GUL transmission manner.

Therefore, in this embodiment of the present invention, the new data indication information #1 may be carried in the G-UCI corresponding to the data packet #1, and is used to indicate whether the data packet #1 is an initially transmitted data packet or a retransmitted data packet. In other words, the new data indication information #1 is a field in the G-UCI corresponding to the data packet #1.

In addition, the G-UCI further includes at least one piece of information in information about a HARQ process number of a HARQ process corresponding to the uplink data, information about a redundancy version (RV) corresponding to the uplink data, and information about a user identifier (denoted as UE ID) of the terminal device, so that the network device obtains the data packet #1 based on the G-UCI.

By way of example rather than limitation, the new data indication information #1 may alternatively be carried in other information related to uplink transmission. This embodiment of the present invention is not limited thereto.

Further, in S210, the network device blindly detects the data packet #1 to attempt to receive the data packet #1.

More specifically, there are three cases of receiving the data packet #1 by the network device:

1. The network device detects the data packet #1, and successfully receives the data packet #1.
2. The network device detects the data packet #1, and does not successfully receive the data packet #1. For example, the network device detects the data packet #1, but fails to demodulate and decode the data packet #1.
3. The network device does not detect the data packet #1.

Both the foregoing second case and third case may be understood as that the network device fails to receive the data packet #1.

It should be understood that, that "the network device detects the data packet #1 or does not detect the data packet #1" in this embodiment of the present invention means that "the network device detects existence of the data packet #1 or does not detect existence of the data packet #1", in other words, means that "the network device detects existence of a GUL PUSCH carrying the data packet #1 or does not detect existence of a GUL PUSCH carrying the data packet #1". That "the network device detects the data packet #1" means that the terminal device detects the existence of the GUL PUSCH (in other words, detects that the terminal device sends the GUL PUSCH); and that "the network device does not detect the data packet #1" means that the network device does not detect the existence of the GUL PUSCH (in other words, does not detect that the terminal device sends the GUL PUSCH).

Specifically, the network device determines the existence of the GUL PUSCH by detecting a demodulation reference signal (DMRS) corresponding to the GUL PUSCH or G-UCI used to schedule the GUL PUSCH.

For example, if the network device blindly detects the DMRS corresponding to the GUL PUSCH, or blindly detects the G-UCI used to schedule the GUL PUSCH, it may be considered that the GUL PUSCH is detected; or if the network device does not blindly detect the DMRS corresponding to the GUL PUSCH, or does not blindly detect the G-UCI used to schedule the GUL PUSCH, the GUL PUSCH is not detected.

In addition, that "the network device does not detect the data packet #1" in this embodiment of the present invention also means that "the network device does not have sufficient time to finish detecting or demodulating the data packet #1, in other words, in terms of a receiving time sequence or a demodulation capability, the network device sends instruction information #1 before finishing detecting or demodulating the data packet #1."

Specifically, there is a latency in demodulating the data packet #1 by the network device. When the network device sends, before finishing demodulating the data packet #1, the instruction information #1 to schedule the terminal device to send a next data packet by using the first HARQ process number, the network device does not know the existence of the data packet #1 when sending the instruction information #1. The case in which the network device does not have sufficient time to finish detecting or demodulating the data packet #1 includes: The time unit #1 is later than a time unit carrying the instruction information #1, or the time unit #1 is earlier than a time unit carrying the instruction information #1 but a time interval between the time unit #1 and the time unit carrying the instruction information #1 is shorter than a preset time interval (corresponding to a demodulation latency of the network device).

For example, a latency in scheduling initial transmission or retransmission of a data packet by the network device is 4 ms. When the terminal device sends, on a GUL PUSCH of a subframe #n+2 (namely, the time unit #1) based on a demodulation capability of the network device, the data packet #1 corresponding to the new data indication information #1, the network device can schedule, in a subframe #n+6 at the earliest, the terminal device to perform initial transmission or retransmission on the data packet #1. When the network device sends, in a subframe #n+4 (namely, a time unit carrying the instruction information #1), the instruction information #1 and new data indication information corresponding to a next data packet of the data packet #1, to schedule the terminal device to perform initial transmission on a new data packet, because the network device has not finished demodulating the data packet #1 (in other words, the GUL PUSCH carrying the data packet #1) in the subframe #n+2 at a moment of the subframe #n+4, the new data indication information #2 is not inverted compared with the new data indication information #1, in other words, the network device does not detect the data packet #1.

The following describes related operations of the network device in the foregoing three cases in detail.

For ease of description, in the following, that "the network device detects the data packet #1 or does not detect the data packet #1" in this embodiment of the present invention is collectively described as that "the network device detects the existence of the data packet #1 or does not detect the existence of the data packet #1".

In S220, the network device sends first instruction information, where the first instruction information is used to instruct the terminal device to send a second data packet in a second time unit, the second data packet corresponds to the first HARQ process number, the second time unit is located after the first time unit in terms of time, the second data packet corresponds to second new data indication information sent by the network device, and the second new data indication information is used to indicate whether the second data packet is an initially transmitted data packet or a retransmitted data packet.

Therefore, the terminal device receives the first instruction information.

Specifically, when the network device needs to schedule, in a scheduling manner, the terminal device to send uplink data by using the same HARQ process number (namely, the first HARQ process number), the network device sends the instruction information #1 (namely, an example of the first instruction information) to the terminal device, where the instruction information #1 is used to instruct the terminal device to send, in a time unit #2 (namely, an example of the second time unit), a data packet #2 (namely, an example of the second data packet) corresponding to the first HARQ process number.

In other words, the instruction information #1 is scheduling-based information. To be specific, the instruction information #1 may be scheduling information corresponding to the data packet #1.

Optionally, the instruction information #1 may be UL grant information. For example, the instruction information #1 is dynamic UL grant information.

Optionally, the instruction information #1 may be some fields in the UL grant information. Specifically, the instruction information #1 may be a bit field or a bit (excluding the second new data indication information) used for data scheduling in the UL grant information. More specifically, the instruction information #1 may include other information, other than the second new data indication information, in the UL grant information.

It should be noted that, that the instruction information #1 is used to instruct the terminal device to send the data packet #2 in the time unit #2 means instructing the terminal device to send the data packet #2 by using a transmission format (denoted as a transmission format #2 for ease of distinguishing and understanding) corresponding to the data packet #2. In other words, the instruction information #1 is used to indicate the transmission format #2.

Specifically, the transmission format #2 includes at least one of a radio resource used to transmit the data packet #2, a generation format of the data packet #2, a pilot format of the data packet #2, and a feedback format of the data packet #2.

The radio resource used to transmit the data packet #2 includes at least one of a time domain resource (including the time unit #1) corresponding to a PUSCH carrying the data packet #2 and a frequency domain resource corresponding to the PUSCH carrying the data packet #2.

The generation format of the data packet #2 includes a manner in which the terminal device generates the data packet #2 through modulation and coding, for example, includes at least one of a modulation and coding scheme (MCS) and a transport block size (TBS).

The pilot format of the data packet #2 includes a manner in which the terminal device sends a pilot sequence, for example, sequence information of a DMRS corresponding to the PUSCH on which the data packet #2 is located.

The feedback format of data packet #2 includes a manner in which the terminal device sends feedback information, for example, includes at least one of whether to feed back downlink HARQ-ACK information and whether to feed back channel state information (CSI).

It should be noted that the time unit carrying the instruction information #1 may be located before or after the time unit #1 in terms of time.

It should be understood that the data packet #2 is a next data packet that the network device schedules the terminal device to send after the time unit #1 and that corresponds to the first HARQ process number.

Optionally, the data packet #2 is a first data packet or a latest data packet that the network device schedules the terminal device to send after the time unit #1 and that corresponds to the first HARQ process number.

In other words, the data packet #2 is a first data packet or a latest data packet that the network device schedules the terminal device to send by using the first HARQ process number after the time unit #1.

In other words, the data packet #1 is a latest data packet that is sent by the terminal device before the time unit #2 and that corresponds to the first HARQ process number.

By way of example rather than limitation, the data packet #2 may be an $N^{th}$ data packet that the network device schedules the terminal device to send after the time unit #1 and that corresponds to the first HARQ process number, where N is an integer greater than 1. In this case, each of (N−1) data packets that are sent after the time unit #1 and that correspond to the first HARQ process number corresponds to a same value of new data indication information.

Similar to the new data indication information #1, a size of the new data indication information #2 (namely, an example of the second new data indication information) may also be one bit, and a value of the new data indication information #2 corresponds to two states: "0" and "1", which are respectively used to indicate that the data packet #2 is an initially transmitted data packet or a retransmitted data packet. In addition, the size of the new data indication information #1 is the same as the size of the new data indication information #2.

The new data indication information #2 may be carried in the instruction information #1. In other words, the new data indication information #2 is a field in the instruction information #1.

The new data indication information #2 and the instruction information #1 may be carried in same information, and the new data indication information #2 and the instruction information #1 corresponds to different fields in the information. For example, the new data indication information #2 and the instruction information #1 are carried in dynamic UL grant information. Alternatively, the new data indication information #2 and the instruction information #1 may be carried in different information. This is not limited in this embodiment of the present invention.

In addition, the new data indication information #2 may alternatively be carried in other information related to downlink transmission. This embodiment of the present invention is not limited thereto.

It should be understood that a downlink time unit carrying the new data indication information #2 may be earlier than the time unit #1, or may be later than the time unit #1. This is not limited herein.

Similarly, a downlink time unit carrying the instruction information #1 may be earlier than the time unit #1, or may be later than the time unit #1. This is not limited herein.

Specifically, the new data indication information #2 is NDI information. More specifically, the new data indication information #2 is an NDI field in a UL grant.

Optionally, the method further includes: sending, by the terminal device, the first new data indication information to the network device.

Further, in some cases, the network device may determine the new data indication information #2 based on the new data indication information #1.

Specifically, in this embodiment of the present invention, the network device may determine the new data indication information #2 based on the receiving state of the data packet #1 and the new data indication information #1, or may determine the new data indication information #2 based on a receiving state of the data packet #3 and new data indication information (denoted as new data indication information #3 for ease of distinguishing and understanding) corresponding to the data packet #3. The new data indication information #3 is used to indicate that the data packet #1 is an initially transmitted data packet or a retransmitted data packet, and a specific situation depends on the state (namely, the foregoing three cases) of receiving the data packet #1 by the network device. The following separately describes in detail a procedure in which the network device determines the new data indication information #2 in the foregoing three cases.

Case 1

Optionally, when the network device detects the data packet #1, the network device determines the new data indication information #2 based on the receiving state of the data packet #1 and the new data indication information #1.

In this case, the terminal device can detect the existence of the data packet #1. When determining whether the data packet #1 is successfully received, the network device may determine the new data indication information #2 based on the new data indication information #1.

Case 1-1

Optionally, when the network device detects the data packet #1, and the network device successfully receives the data packet #1, the value of the new data indication information #2 is different from the value of the new data indication information #1.

To be specific, the network device not only can receive the data packet #1, but also successfully demodulates and decodes the data packet #1. In this case, not only the network device determines the new data indication information #2 based on the data packet #1 and the new data indication information #1, but also the value of the new data indication information #2 is different from the value of the new data indication information #1.

Case 1-2

Optionally, when the network device detects the data packet #1, and the network device does not successfully receive the data packet #1, the value of the new data indication information #2 is the same as the value of the new data indication information #1.

In other words, the network device can detect the existence of the data packet #1, but cannot correctly receive the data packet #1. For example, the network device can receive the data packet #1, but fails to demodulate and decode the data packet #1.

In this case, not only the network device determines the new data indication information #2 based on the data packet #1 and the new data indication information #1, but also the value of the new data indication information #2 is the same as the value of the new data indication information #1.

Case 2

Optionally, when the network device does not detect the data packet #1, the network device determines the new data indication information #2 based on the receiving state of the data packet #3 and the new data indication information #3.

To be specific, the network device does not know that the terminal device sends the data packet #1 (in other words, the network device does not know the existence of the data packet #1), the network device may determine the new data indication information #2 based on the receiving state of the data packet #3 and the new data indication information #3.

It should be understood that the network device can determine the new data indication information #2 based on the receiving state of the data packet #3 and the new data indication information #3, and therefore, the network device can certainly know existence of the data packet #3: If the data packet #3 is a data packet scheduled by the network device, the network device receives the data packet #3 in a time unit in which the terminal device is expected to send the data packet #3. Therefore, the network device can certainly know whether the network device successfully receives the data packet #3 and the new data indication information #3 corresponding to the data packet #3. If the data packet #3 is a data packet sent by the terminal device in the GUL transmission manner, the network device can detect the existence of the data packet #3 (for example, through detecting G-UCI), and also knows the corresponding new data indication information #3 (for example, the new data indication information #3 is included in the G-UCI).

When the data packet #3 is a data packet sent by the terminal device in the GUL transmission manner, the new data indication information #3 is sent by the terminal device, and a procedure in which the network device determines the new data indication information #2 based on the receiving state of the data packet #3 and the new data indication information #3 is as follows.

If the network device fails to receive the data packet #3, the value of the new data indication information #2 is the same as the value of the new data indication information #3, and the value of the new data indication information #2 is the same as the value of the new data indication information #1; or if the network device successfully receives the data packet #3, the value of the new data indication information #2 is different from the value of the new data indication information #3, and the value of the new data indication information #2 is the same as the value of the new data indication information #1.

When the data packet #3 is a data packet scheduled by the network device, the new data indication information #3 is sent by the network device to the terminal device, and a procedure in which the network device determines the new data indication information #2 based on the receiving state of the data packet #3 and the new data indication information #3 is as follows:

If the network device detects the data packet #3 and does not successfully receive the data packet #3, the value of the new data indication information #2 is the same as the value of the new data indication information #3, and the value of the new data indication information #2 is the same as the value of the new data indication information #1; or if the network device successfully receives the data packet #3, the value of the new data indication information #2 is different from the value of the new data indication information #3, and the value of the new data indication information #2 is the same as the value of the new data indication information #1.

Specifically, the new data indication information #3 is NDI information. More specifically, when the data packet #3 is a data packet that the network device schedules the terminal device to send, the new data indication information #3 is an NDI field in a UL grant. When the data packet #3 is a data packet sent by the terminal device in the GUL transmission manner, the new data indication information #3 is an NDI field in G-UCI reported by the terminal device to the network device.

Therefore, after the terminal device obtains the new data indication information #1 and the new data indication information #2, in S230, the terminal device performs buffering processing on the first data packet or sends the second data packet, based on the value of the first new data indication information and the value of the second new data indication information, where the second data packet is a retransmitted data packet of the first data packet, or the second data packet is an initially transmitted data packet different from the first data packet.

In other words, the terminal device sends the data packet #2 based on whether the value of the new data indication information #1 is the same as the value of the new data indication information #2.

In other words, the terminal device sends the data packet #2 based on whether the value of the new data indication information #1 is inverted compared with the value of the new data indication information #2.

It should be understood that, that the value of the new data indication information #1 is different from the value of the new data indication information #2 is also referred to as that the value of the new data indication information #2 is inverted compared with the value of the new data indication information #1. That the value of the new data indication information #1 is the same as the value of the new data indication information #2 is also referred to as that the value of the new data indication information #2 is not inverted compared with the value of the new data indication information #1. Similarly, the foregoing invert relationship between the two pieces of new data indication information (to be specific, a correspondence between an invert/non-invert situation and a same/different value of the two pieces of new data indication information) may be applicable to any two pieces of new data indication information, for example, an invert relationship between the value of the new data indication information #1 and the value of the new data indication information #3, or an invert relationship between the value of the new data indication information #2 and the value of the new data indication information #3.

Specifically, it is assumed that the size of the new data indication information #1 and the size of the new data indication information #2 are each one bit corresponding to two states: "0" and "1". When the value of the new data indication information #1 is "0" and the value of the new data indication information #2 is "1", or when the value of the new data indication information #1 is "1" and the value of the new data indication information #2 is "0", the value of the new data indication information #1 is different from the value of the new data indication information #2, in other words, the value of the new data indication information #2 is inverted compared with the value of the new data indication information #1. When the value of the new data indication information #1 is "0" and the value of the new data indication information #2 is "0", or when the value of the new data indication information #1 is "1" and the value of the new data indication information #2 is "1", the value of the new data indication information #1 is the same as the value of the new data indication information #2, in other words, the value of the new data indication information #2 is not inverted compared with the value of the new data indication information #1.

For ease of description in the following, this embodiment of the present invention is uniformly described by using "the values of the new data indication information #1 and the new data indication information #2 are the same or different".

In this embodiment of the present invention, there are three cases: Case A, Case B, and Case C, in which the terminal device processes the data packet #1 or the data packet #2 based on the value of the new data indication information #1 and the value of the new data indication information #2.

Case A

When the value of the new data indication information #1 is the same as the value of the new data indication information #2, the terminal device sends a retransmitted data packet of the data packet #1. In other words, the data packet #2 is the retransmitted data packet of the data packet #1.

In other words, when the value of the new data indication information #2 is not inverted compared with the value of the new data indication information #1, the terminal device sends a retransmitted data packet of the data packet #1. In other words, the data packet #2 is the retransmitted data packet of the data packet #1.

For the network device, the relationship between the value of the new data indication information #1 and the value of the new data indication information #2 may correspond to a relationship between the value of the new data indication information #1 and the value of the new data indication information #2 in Case 1-2 and Case 2, that is, a relationship between the foregoing two types of new data indication information when the network device fails to receive the data packet #1.

Case B

When the value of the new data indication information #1 is different from the value of the new data indication information #2, the terminal device sends an initially transmitted data packet different from the data packet #1. In other words, the data packet #2 is the initially transmitted data packet different from the data packet #1.

In other words, when the value of the new data indication information #2 is inverted compared with the value of the new data indication information #1, the terminal device sends an initially transmitted data packet different from the data packet #1. In other words, the data packet #2 is the initially transmitted data packet different from the data packet #1.

For the network device, the relationship between the value of the new data indication information #1 and the value of the new data indication information #2 may correspond to the relationship between the value of the new data indication information #1 and the value of the new data indication information #2 in Case 1-1, that is, the relationship between the foregoing two types of new data indication information when the network device successfully receives the data packet #1.

Case C

When the value of the new data indication information #1 is the same as the value of the new data indication information #2, the terminal device retains the data packet #1 in a buffer.

In other words, the terminal device retains or does not clear the data packet #1 in a HARQ buffer corresponding to the first HARQ process number.

Similar as in Case A, for the network device, the relationship between the value of the new data indication information #1 and the value of the new data indication information #2 may correspond to the relationship between the value of the new data indication information #1 and the value of the new data indication information #2 in Case 1-2 and Case 2, that is, the relationship between the foregoing two types of new data indication information when the network device fails to receive the data packet #1.

It should be noted that Case A and Case C may coexist. To be specific, the terminal device sends the retransmitted data packet of the data packet #1, and the terminal device may also retain the data packet #1 in the buffer.

In this embodiment of the present invention, optionally, the method further includes: determining, by the terminal device based on the value of the new data indication information #1 and the value of the new data indication information #2, the state of receiving the data packet #1 by the network device.

Optionally, the receiving state of the data packet #1 includes an acknowledgment ACK or a negative acknowledgment NACK.

Optionally, the method further includes: determining, by the terminal device based on the value of the new data indication information #1 and the value of the new data indication information #2, that the network device does not detect the data packet #1.

Specifically, if the value of the new data indication information #1 is the same as the value of the new data indication information #2, the terminal device determines that the network device detects the data packet #1 and that the receiving state of the data packet #1 is the NACK, or the terminal device determines that the network device does not detect the data packet #1; or if the value of the new data indication information #1 is different from the value of the new data indication information #2, the terminal device determines that the network device detects the data packet #1 and the receiving state of the data packet #1 is the ACK. For the network device, if the network device fails to receive the data packet #1 (the network device detects the data packet #1 but fails to demodulate and decode the data packet #1, or the network device does not detect the data packet #1), the network device determines that the value of the new data indication information #2 is the same as the value of the new data indication information #1. In contrast, if the terminal device determines that the value of the new data indication information #2 is the same as the value of the new data indication information #1, the terminal device considers that the network device does not correctly receive the data packet #1, to be specific, considers that the network device receives the data packet #1 and the receiving state of the data packet #1 is the NACK, or considers that the network device does not detect the data packet #1, so that the terminal device can determine that the terminal device needs to retain the data packet #1 in the buffer or send a retransmitted data packet of the data packet #1.

Similarly, if the network device successfully receives the data packet #1, the network device determines that the value of the new data indication information #2 is different from the value of the new data indication information #1. If the terminal device determines the value of the new data indication information #2 is different from the value of the new data indication information #1, the terminal device can determine that the terminal device needs to send an initially transmitted data packet different from the data packet #1, and therefore, considers that the network device correctly receives the data packet #1, in other words, considers that the state of receiving the data packet #1 by the network device is the ACK, so that the terminal device may send an initially transmitted data packet different from the data packet #1.

Figure 3:
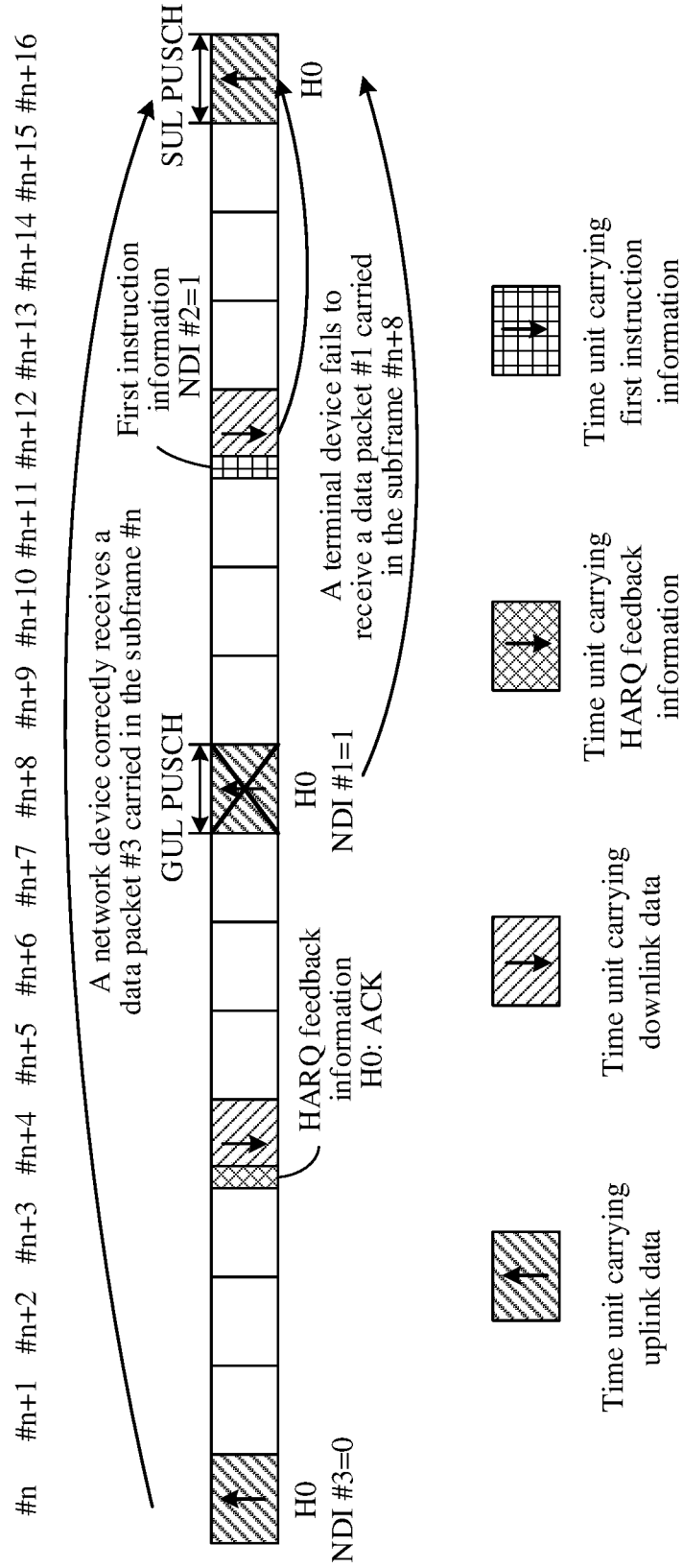
FIG. 3 to FIG. 12 are each a schematic diagram of behavior of a network device and a terminal device in a data transmission procedure according to an embodiment of the present invention.
Figure 4:
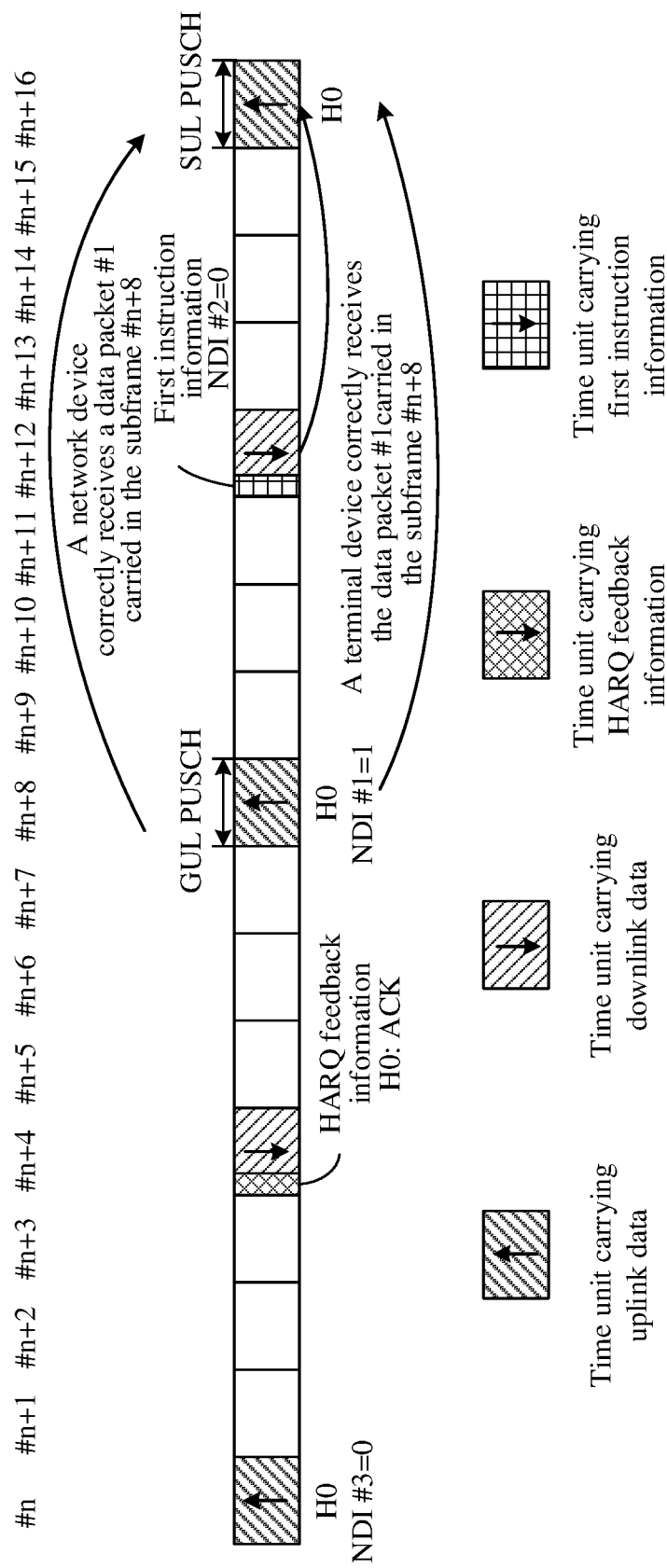

The following describes in detail a data transmission procedure according to the embodiments of the present invention with reference to FIG. 3 and FIG. 4.

FIG. 3 is a schematic diagram of behavior of the network device and the terminal device in a data transmission procedure according to an embodiment of the present invention.

As shown in FIG. 3, the terminal device sends, in a subframe #n, the data packet #3 corresponding to the first HARQ process number (namely, a HARQ process number #Ho), and the value of the new data indication information #$_3$ corresponding to the data packet #3 is "0" (that is, NDI #3=0 shown in FIG. 3). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, and the value of the new data indication information #1 corresponding to the data packet #1 is "1" (that is, NDI #1=1 shown in FIG. 3). The network device cannot detect the data packet #1. In addition, the network device schedules, in a subframe #n+12 by using the instruction information #1, the terminal device to send the data packet #2 in a subframe #n+16 (namely, the time unit #2) by using the HARQ process number #Ho.

In this case, because the network device does not detect the data packet #1 (to be specific, "x" shown in the subframe #n+8 in FIG. 3 indicates that the network device does not detect the data packet #1), the network device determines the new data indication information #2 based on the data packet #3 and the corresponding new data indication information #3. To be specific, the network device determines that the data packet #2 is an initially transmitted data packet of the data packet #$_3$, so as to determine that the value of the new data indication information #2 is "1" (that is, NDI #2=1 shown in FIG. 3). After the terminal device receives the new data indication information #2, the terminal device compares the value of the new data indication information #2 with the value of the new data indication information #1, to determine that the value of the new data indication information #2 is the same as the value of the new data indication information #1. In this case, the terminal device considers that the network device fails to receive the data packet #1 (in other words, a state of receiving the data packet #1 by the network device is an NACK or the data packet #1 is not detected), and therefore, the terminal device sends the retransmitted data packet of the data packet #1, or retains the data packet #1 in a buffer.

FIG. 4 is another schematic diagram of behavior of the network device and the terminal device in a data transmission procedure according to an embodiment of the present invention.

As shown in FIG. 4, the terminal device sends, in a subframe #n, the data packet #3 corresponding to the first HARQ process number (namely, a HARQ process number #Ho), and the value of the new data indication information #3 corresponding to the data packet #3 is "0" (that is, NDI #3=0 shown in FIG. 4). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, and the value of the new data indication information #1 corresponding to the data packet #1 is "1" (that is, NDI #1=1 shown in FIG. 4). The network device successfully receives the data packet #1. In addition, the network device schedules, in a subframe #n+12 by using the instruction information #1, the terminal device to send the data packet #2 in a subframe #n+16 (namely, the time unit #2) by using the HARQ process number #Ho.

In this case, because the network device successfully receives the data packet #1, the network device determines the new data indication information #2 based on the data packet #1 and the corresponding new data indication information #1. To be specific, the network device determines that the data packet #2 is an initially transmitted data packet different from the data packet #1, and therefore, determines that the value of the new data indication information #2 is "0" (that is, NDI #2=0 shown in FIG. 4), and is different from the value of the new data indication information #1. After the terminal device receives the new data indication information #2, the terminal device compares the value of the new data indication information #2 with the value of the new data indication information #1, to determine that the value of the new data indication information #2 is different from the value of the new data indication information #1. In this case, the terminal device considers that the network device successfully receives the data packet #1 (in other words, a receiving state is an NACK), and therefore, the terminal device sends the initially transmitted data packet different from the data packet #1.

In the prior aft, the terminal device does not process a data packet based on a relationship between the value of the new data indication information #1 and the value of the new data indication information #2, but always sends a new data packet according to instruction of the instruction information #1 (without considering the value of the new data indication information #2). Consequently, a loss of the data packet #1 is caused especially in Case 1.

Therefore, according to the data transmission method in this embodiment of the present invention, after receiving the first instruction information used to instruct the terminal device to send the second data packet corresponding to the first HARQ process number, the terminal device performs buffering processing on the first data packet or determines a transmission type of the second data packet, based on the value of the second new data indication information corresponding to the second data packet and the value of the first new data indication information corresponding to the first data packet that is sent by the terminal device in the GUL transmission manner, to send the second data packet, where the second data packet is a retransmitted data packet of the first data packet, or the second data packet is an initially transmitted data packet different from the first data packet. Particularly, when the network device does not detect the first data packet, and when the network device instructs, by using the first instruction information, the terminal device to transmit an initially transmitted data packet corresponding to the first HARQ process number, the terminal device no longer transmits the initially transmitted data packet according to the first instruction information, but sends a retransmitted data packet of the first data packet, and no longer clears the first data packet in the buffer, but retains the first data packet in the buffer. Therefore, a loss of the first data packet is reduced, data transmission reliability is improved, and system flexibility is also improved.

Optionally, before the terminal device sends the first data packet to the network device in the first time unit in the grant free uplink GUL transmission manner, the method further includes: receiving, by the terminal device, control information sent by the network device, where the control information includes fourth new data indication information, and a value of the fourth new data indication information is a first preset value when the control information is used to activate or reactivate the terminal device to send information in the GUL transmission manner; and determining, by the terminal device based on the control information, a semi-persistent time domain resource corresponding to the GUL transmission manner, where the first time unit belongs to the semi-persistent time domain resource.

Specifically, a size of new data indication information #4 (namely, an example of the fourth new data indication information) may be one bit, a value of the new data indication information #4 corresponds to two states: "0" and "1", and the first preset value may be "0" or "1". For example, when the control information is used to activate or reactivate the terminal device to send information in the GUL transmission manner, the first preset value is "0". For another example, when the control information is used to activate or reactivate the terminal device to send information in the GUL transmission manner, the first preset value is "1". Specifically, the new data indication information #4 is NDI information. More specifically, the new data indication information #4 is an NDI field in the control information.

In this embodiment of the present invention, the control information is used to activate or reactivate the terminal device to send information in the GUL transmission manner. It may also be understood as that the control information is used to configure the semi-persistent time domain resource corresponding to the GUL transmission manner. It may also be understood as that the control information is used to enable the terminal device to send information on the semi-persistent time domain resource in the GUL transmission manner. In other words, the terminal device can start to send information on the semi-persistent time domain resource in the GUL transmission manner only after receiving the control information. Therefore, the terminal device may determine the semi-persistent time domain resource based on the control information, so as to send the data packet #1 in the GUL transmission manner by using the time unit #1 in the semi-persistent time domain resource.

The semi-persistent time domain resource may be a persistent time domain resource. Specifically, once the terminal device receives the control information, and activates or reactivates, based on the control information, the terminal device to send information in the GUL transmission manner, the semi-persistent time domain resource corresponding to the GUL transmission manner is persistent. In other words, even if a relatively long period of time elapses after the terminal device receives the control information, the time domain resource corresponding to the GUL transmission manner still exists, until a new semi-persistent time domain resource is configured when a next piece of control information for reactivation is received again, or control information for deactivation is received to instruct the terminal device not to send information in the GUL transmission manner any longer. By comparison, dynamic scheduling based on the UL grant information takes effect only in a limited quantity of time units.

It should be understood that the semi-persistent time domain resource herein is the foregoing available GUL radio resource.

Optionally, the semi-persistent time domain resource may be a periodic time domain resource. Each period may include one time unit, or may include at least two time units, or may include all time units in the period. For example, 4 ms is used as a period, and when the semi-persistent time domain resource activated or reactivated by using the control information is first 2 ms in each period, the semi-persistent time domain resource includes subframes {#1, #2}, {#5, #6}, {#9, #10}, . . . , {#4K+1, #4K+2}, . . . , and the like, where K is a positive integer; or when the semi-persistent time domain resource activated or reactivated by using the control information is first 1 ms in each period, the semi-persistent time domain resource includes subframes {#1}, {#5}, {#9}, . . . , {#4K+1}, . . . , and the like. 1 ms is used as a period, and when the semi-persistent time domain resource activated or reactivated by using the control information is 1 ms in each period, the semi-persistent time domain resource includes subframes {#1}, {#2}, {#3}, . . . , {K}, . . . , and the like.

Optionally, the period is a period configured by the network device by using higher layer signaling. Alternatively, the period may be a predefined value, for example, 1 ms.

By way of example rather than limitation, the semi-persistent time domain resource may alternatively be a non-periodic time domain resource satisfying a persistency feature.

It should be understood that, when the terminal device has not been activated to send information in the GUL transmission manner before, the control information is used to activate GUL. After receiving the control information, the terminal device may start to send information in the GUL transmission manner in at least one random time unit in the semi-persistent time domain resource. When the terminal device has been activated to send information in the GUL transmission manner before, the control information is used to reactivate GUL. In this case, the control information is used to configure the terminal device to use an updated semi-persistent time domain resource (different from that used in the previous GUL transmission), and the terminal device may start to send information in the GUL transmission manner in at least one random time unit in the updated semi-persistent time domain resource.

Optionally, activation or reactivation means that the terminal device may be activated or reactivated to send information in the GUL transmission manner by using all HARQ process numbers that can be used for GUL transmission. Specifically, all the HARQ process numbers that can be used for GUL transmission may be predefined, or may be configured by the network device by using higher layer signaling.

Optionally, activation or reactivation means that the terminal device may be activated or reactivated to send information in the GUL transmission manner by using at least one specific HARQ process number. Specifically, the at least one specific HARQ process number is indicated by the control information.

It should be noted that the control information not only includes the new data indication information #4, but also includes other information, for example, at least one of a field used to indicate power adjustment (TPC) of the terminal device and a field used to indicate frequency domain resource allocation (RA).

Correspondingly, when the control information is used to activate or reactivate the terminal device to send information in the GUL transmission manner, not only the value of the new data indication information #4 is a preset value, but also a value of other information may be preset. For example, a preset value of the TPC field is in a state of all "0", and a preset value of the RA field is in a state of all "0". It should be understood that, when the foregoing at least one field including the new data indication information #4 is a preset value corresponding to the at least one field, the control information is used to activate or reactivate the terminal device to send information in the GUL transmission manner.

It should be further noted that the control information is not only used to activate or reactivate the semi-persistent time domain resource corresponding to the GUL transmission manner, but also may be used to configure other information corresponding to the GUL transmission manner.

For example, the other information corresponding to the GUL transmission manner includes at least one of a frequency domain resource, a generation format, a pilot format, and a feedback format that correspond to an uplink data packet sent in the GUL transmission manner. The generation format corresponding to the uplink data packet includes a manner in which the terminal device generates the uplink data packet through modulation and coding, for example, includes at least one of a modulation and coding scheme (MCS) and a TBS; the pilot format corresponding to the uplink data packet includes a manner in which the terminal device sends a pilot sequence, for example, sequence information of a DMRS corresponding to a PUSCH on which the uplink data packet is located; and the feedback format of the uplink data packet includes a manner in which the terminal device sends feedback information, for example, includes at least one of whether to feed back downlink HARQ-ACK information and whether to feed back CSI information.

In this embodiment of the present invention, the control information may be semi-persistent UL grant information (which is denoted as semi-persistent UL grant information #1 for ease of distinguishing and understanding). In addition, to distinguish the control information (in other words, the semi-persistent UL grant information #1) from the instruction information #1 (in other words, the dynamic UL grant information), different scrambling is performed on the two types of information. To be specific, the control information (in other words, the semi-persistent UL grant information #1) is scrambled by using an RNTI #1 (namely, an example of a first RNTI), and the instruction information #1 is scrambled by using an RNTI #2 (namely, an example of a second RNTI), where the RNTI #1 is different from the RNTI #2. For example, the RNTI #1 may be a semi-persistent scheduling (SPS) C-RNTI, a GUL C-RNTI, or a G-RNTI, and the RNTI #2 may be a C-RNTI.

Optionally, before the terminal device sends the first data packet to the network device in the first time unit in the grant free uplink GUL transmission manner, the method further includes: receiving, by the terminal device, control information sent by the network device, where the control information includes fourth new data indication information, and a value of the fourth new data indication information is a first preset value when the control information is used to activate or reactivate the terminal device to send information in the GUL transmission manner; and ignoring, by the terminal device, the fourth new data indication information when determining the first new data indication information.

Specifically, when the value of the new data indication information #4 is the first preset value, it also indicates that an uplink data packet (including the data packet #1) is an initially transmitted data packet. For the data packet #1, the new data indication information #1 is determined based on a transmission relationship between the data packet #1 and the data packet #3 and the new data indication information #3 corresponding to the data packet #3 (as described below), and is not a preset value. Therefore, initial transmission or retransmission of a data packet indicated by the new data indication information #1 may be inconsistent with initial transmission or retransmission of a data packet indicated by the new data indication information #4. Therefore, the terminal device ignores the new data indication information #4 when determining the new data indication information #1. In other words, the terminal device does not determine the new data indication information #1 based on the new data indication information #4 carried in the control information. However, the terminal device sends the data packet #1 based on the other information (at least one of the frequency domain resource, the generation format, the pilot format, and the feedback format of the uplink data packet) that corresponds to the GUL transmission manner and that is carried in the control information.

Optionally, the value of the fourth new data indication information is a second preset value when the control information is used to schedule a retransmitted data packet of a fourth data packet, the fourth data packet is a data packet sent by the terminal device in the GUL transmission manner, and the second preset value is different from the first preset value.

In other words, the new data indication information #4 has two values: the foregoing first preset value and the second preset value herein. The different values of the new data indication information #4 correspond to different functions of the control information. To be specific, when the value of the new data indication information #4 is the first preset value, the control information is used to activate or reactivate the terminal device to send information in the GUL transmission manner; and when the value of the new data indication information #4 is the second preset value, the control information is used to schedule a retransmitted data packet of a data packet #4 (namely, an example of the fourth data packet) (in other words, the control information is used to schedule a retransmitted data packet, or the control information is used to instruct the terminal device to retransmit the data packet #4), in other words, the control information is used to schedule the terminal device to send the retransmitted data packet of the data packet #4. Specifically, the value of the new data indication information #4 corresponds to two states: "0" and "1". When the first preset value is "0", the second preset value is "1"; or when the first preset value is "1", the second preset value is "0".

Optionally, when the control information is used to schedule the terminal device to send the retransmitted data packet of the data packet #4, in addition to that the new data indication #4 corresponds to the second preset value, the control information further includes another field corresponding to a preset value, for example, at least one of the foregoing TPC field and RA field. When the control information is used to schedule retransmission, the preset value corresponding to the another field in the control information may be the same as or different from that of the another field included in the control information when the control information is used for activation or reactivation.

Because the value of the new data indication information #4 is the second preset value, the terminal device can directly determine, based on the value of the new data indication information #4, that the terminal device needs to send a retransmitted data packet of the data packet #4 However, for the foregoing new data indication information #2, because the value of the new data indication information #2 is not preset, but is related to the state of receiving the data packet #1 by the network device, and the value of the new data indication information #2 is determined based on a value of new data indication information corresponding to a previous data packet (that is, the value of the new data indication information #1 or the value of the new data indication information #3), for the terminal device, when "the terminal device sends a retransmitted data packet or an initially transmitted data packet based on the value of the new data indication information #1 and the value of the new data indication information #2", the terminal device cannot determine, based on only the new data indication information #2, to send an initially transmitted data packet or a retransmitted data packet.

In this embodiment of the present invention, the state of receiving the uplink data packet by the network device may alternatively be indicated by using HARQ feedback information in addition to the semi-persistent UL grant information and the dynamic UL grant information. The uplink data packet may be sent in an SUL transmission manner, or may be sent in the GUL transmission manner.

In an indication manner based on the HARQ feedback information, the HARQ feedback information includes indication information used to indicate whether previous uplink transmission corresponding to a HARQ process number (in other words, a previous data packet corresponding to the HARQ process number) is correctly received by the network device, but does not include scheduling information used by the network device to schedule the terminal device to perform initial transmission or retransmission by using the HARQ process number.

Optionally, the HARQ feedback information includes a receiving state corresponding to a HARQ process in at least one TTI, and the at least one TTI has a predefined time association or a time association indicated by the network device with a TTI in which the HARQ feedback information is located. Specifically, the HARQ feedback information uses a PHICH channel and a corresponding HARQ feedback manner. For example, a receiving state of a HARQ process in a TTI #n is indicated by using HARQ feedback information in a TTI #n+k (k>0).

Optionally, the HARQ feedback information includes a receiving state of each HARQ process in a HARQ process set (including at least one HARQ process and including a HARQ process corresponding to the first HARQ process number). The HARQ process set may be configured by the network device, or may be predefined or fixed. Specifically, the HARQ feedback information indicates the receiving state of each HARQ process in the HARQ process set in a bit map manner. In this case, the HARQ feedback information is also referred to as grant free downlink control information (G-DCI).

Optionally, the ACK is represented by "1" in binary, and the NACK is represented by "0" in binary. For example, when HARQ processes (represented by HARQ process numbers) included in the HARQ process set are {#0, #1, #2, #3}, if #0 and #1 are correctly received, and #2 and #3 are incorrectly received, the bit map included in the G-DCI is {1, 1, 0, 0}. After receiving the G-DCI, the terminal device may perform initial transmission or retransmission in the GUL transmission manner. For example, when the G-DCI indicates that a receiving state corresponding to a HARQ process number is the ACK, the terminal device may transmit a new data packet by using the HARQ process number, during next data transmission in the GUL transmission manner; or when the G-DCI indicates that a receiving state corresponding to a HARQ process number is the NACK, the terminal device may retransmit a data packet corresponding to previous uplink transmission by using the HARQ process number, during next data transmission in the GUL transmission manner.

The foregoing describes content (to be specific, the semi-persistent UL grant information #1 used to configure the transmission format #1 of the GUL transmission manner, the RNTI #1 used to scramble the semi-persistent UL grant information, and the like) related to the GUL transmission manner in this embodiment of the present invention. The following describes a specific case in which the terminal device sends the retransmitted data packet of the data packet #1 in the foregoing Case A.

In this embodiment of the present invention, the specific case in which the terminal device sends the retransmitted data packet of the data packet #1 also includes two cases: Case A-1 and Case A-2.

Case A-1

Optionally, that the terminal device sends the second data packet when the value of the first new data indication information is the same as the value of the second new data indication information, where the second data packet is a retransmitted data packet of the first data packet, includes: sending, by the terminal device, the second data packet in the second time unit according to the first instruction information.

In other words, the terminal device compares the two pieces of new data indication information, to determine that the value of the new data indication information #2 is the same as the value of the new data indication information #1, and therefore, can determine that the terminal device needs to send a retransmitted data packet of the data packet #1. In this case, the terminal device may directly send the retransmitted data packet of the data packet #1 in the time unit #2 according to the instruction information #1. In other words, the terminal device sends the retransmitted data packet of the data packet #1 according to the instruction information #1 by using the transmission format #2 corresponding to the data packet #2.

Therefore, when sending the retransmitted data packet of the first data packet, the terminal device may directly retransmit the first data packet in the second time unit according to instruction of the first instruction information, thereby effectively using current signaling and reducing signaling overheads.

By way of example rather than limitation, in addition to retransmitting the data packet #1 according to the instruction information #1, the terminal device may alternatively ignore the instruction information #1, to retransmit the data packet #1 based on other information or in another transmission manner.

For example, the terminal device may retransmit the data packet #1 by using a new GUL PUSCH, and specifically, may perform retransmission in the GUL transmission manner in a time unit (included in the available GUL time domain resource) that is after the time unit #2 and that can be used for GUL transmission. In addition, an RV version number used to retransmit the data packet #1 is consistent with an RV version number corresponding to the data packet #1, and may be, for example, an RV #0.

For another example, if the terminal device subsequently receives other dynamic UL grant information used to instruct retransmission, the terminal device may perform retransmission according to the other dynamic UL grant information.

Case A-2

Optionally, that the terminal device sends the second data packet based on the value of the first new data indication information and the value of the second new data indication information includes: sending, by the terminal device, the second data packet in the second time unit according to the first instruction information when the value of the first new data indication information is the same as the value of the second new data indication information and when a transport block size (TBS) corresponding to the first data packet is the same as a TBS corresponding to the second data packet, where the second data packet is a retransmitted data packet of the first data packet.

When the transport block size TBS (denoted as a TBS #1 for ease of distinguishing and understanding) corresponding to the data packet #1 is the same as the TBS (denoted as a TBS #2 for ease of distinguishing and understanding) corresponding to the data packet #2, usually, sending the retransmitted data packet of the data packet #1 according to the instruction information #1 does not cause a loss of valid data information and an increase in complexity of the terminal device. This is because the transmission format #2 included in the instruction information #1 corresponds to the TBS configured by the network device to schedule the data packet #2.

In this embodiment of the present invention, when the terminal device sends the retransmitted data packet of the data packet #1, a relationship between the TBS #1 and the TBS #2 may correspond to the foregoing second case and third case of the state of receiving the data packet #1 by the network device. Details are as follows:

When the network device detects the data packet #1, and does not successfully receive the data packet #1, the TBS #1 is definitely the same as the TBS #2. This is because in this case, the network device knows the existence of the data packet #1, and retransmission combination can be performed only on two data packets with a same TBS. Therefore, when the network device schedules the data packet #2, the TBS #2 corresponding to the data packet #2 is definitely the same as the TBS #1.

When the network device does not detect the data packet #1, in other words, when the network device does not detect the existence of the data packet #1, assuming that the network device successfully receives the data packet #3, the network device schedules the terminal device to send an initially transmitted data packet by using the first HARQ process number. In this case, because the network device does not know existence of the data packet #1, the TBS #1 and the TBS #2 may be the same or may be different.

Regardless of the state of receiving the data packet #1 by the network device, to highly efficiently use resources, the terminal device does not need to distinguish between intentions of the network device (to be specific, the foregoing two cases: the network device detects the data packet #1 but does not successfully receive the data packet #1, and the network device does not detect the data packet #1). When the terminal device sends the retransmitted data packet of the data packet #1, provided that the TBS #1 is the same as the TBS #2, the terminal device sends the retransmitted data packet of the data packet #1 in the time unit #2 according to the instruction information #1. In contrast, the TBS #1 being different from the TBS #2 corresponds to the case in which the network device does not detect the data packet #1. In this case, a resource (in other words, the transmission format #2) scheduled by the network device matches the TBS #2 and does not match the TBS #1. Because the terminal device cannot send data on a resource that does not match the TBS #1, the terminal device may ignore the instruction information #1, and does not send information in the time unit #2.

Figure 5:
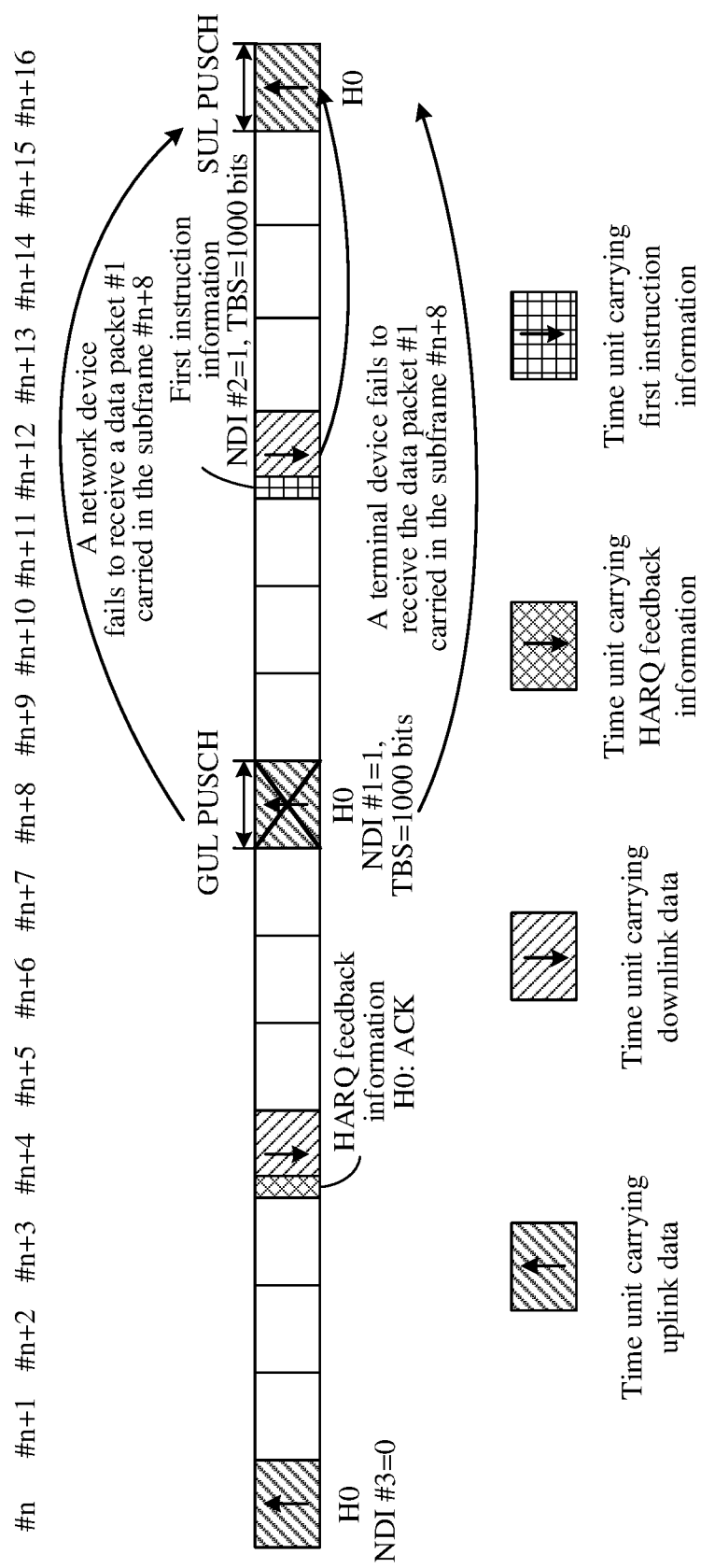
Figure 6:
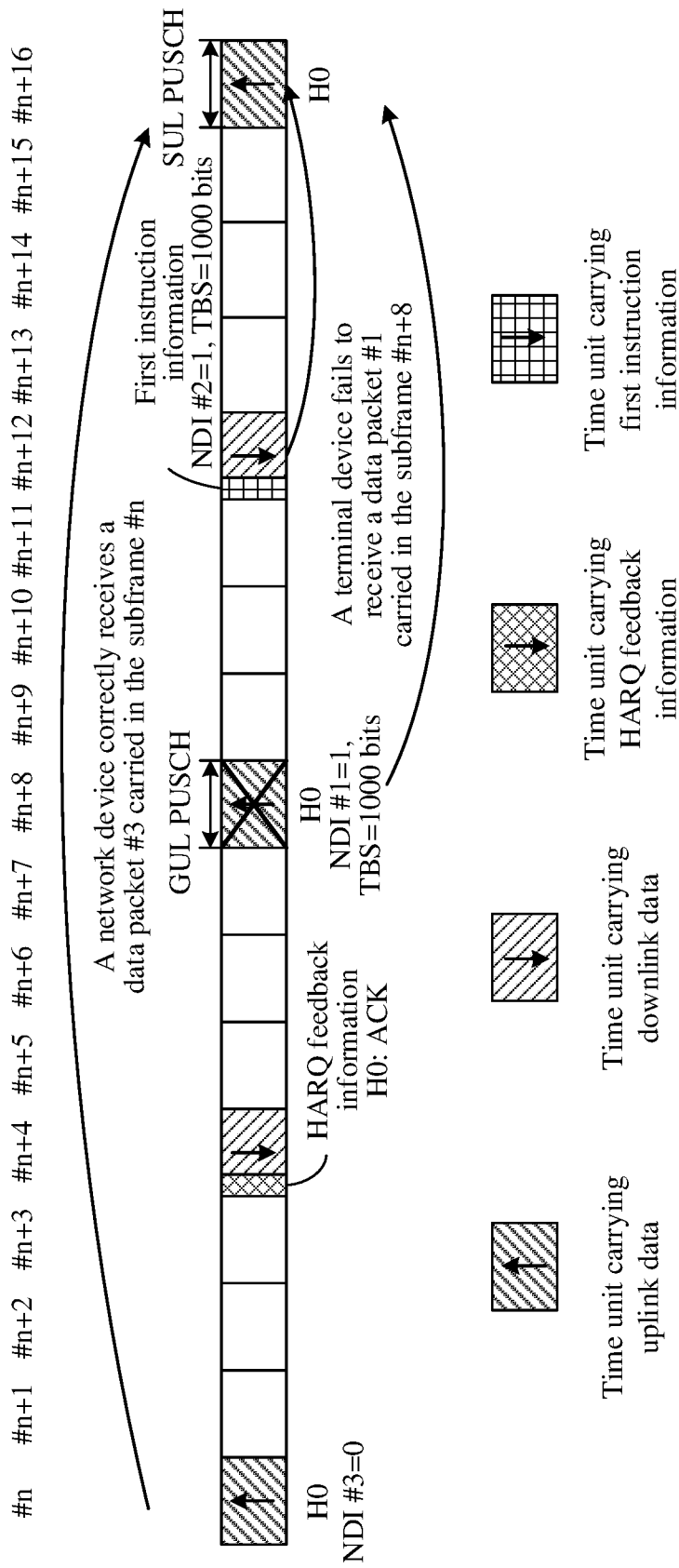
Figure 7:
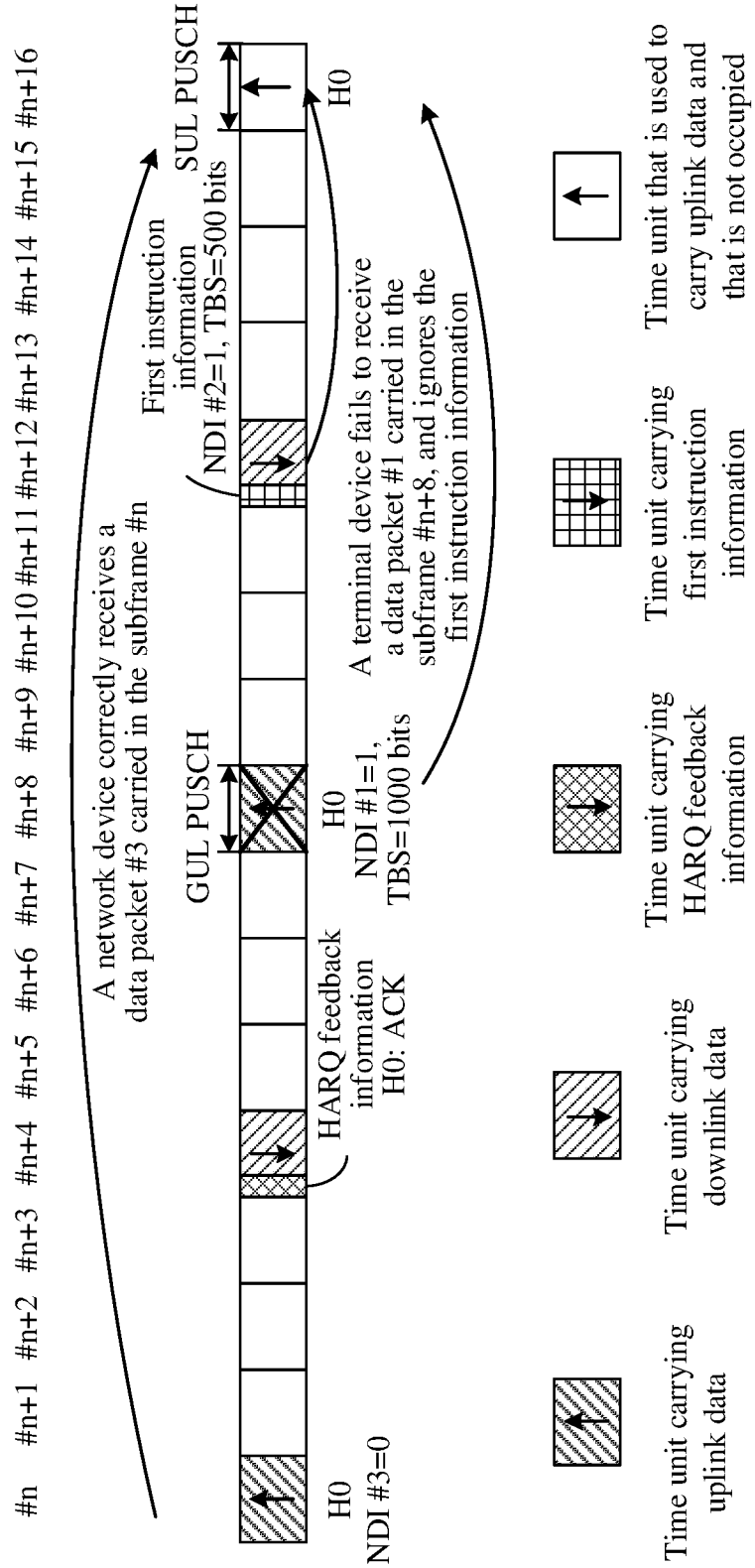

The following describes in detail, with reference to FIG. 5 to FIG. 7 and the state of receiving the data packet #1 by the network device, a procedure in which the terminal device sends the retransmitted data packet of the data packet #1 based on a relationship between the TBS #1 and the TBS #2.

FIG. 5 is another schematic diagram of behavior of the terminal device and the network device in a data transmission procedure according to an embodiment of the present invention.

As shown in FIG. 5, the terminal device sends, in a subframe #n, the data packet #3 corresponding to the first HARQ process number (namely, a HARQ process number #Ho), and the value of the new data indication information #3 corresponding to the data packet #3 is "0" (that is, NDI #3=0 shown in FIG. 5). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, the value of the new data indication information #1 corresponding to the data packet #1 is "1" (that is, NDI #1=1 shown in FIG. 5), and the TBS #1 corresponding to the data packet #1 is 1000 bits. The network device detects the data packet #1, but fails to demodulate and decode the data packet #1. In addition, the network device schedules, in a subframe #n+12 by using the instruction information #1, the terminal device to send the data packet #2 in a subframe #n+16 (namely, the time unit #2) by using the HARQ process number #Ho.

In this case, the network device determines the new data indication information #2 based on the new data indication information #1, in other words, the network device determines that the data packet #2 is a retransmitted data packet of the data packet #1, further determines that the value of the new data indication information #2 is "1" (that is, NDI #2=1 shown in FIG. 5), and the TBS #2 corresponding to the data packet #2 scheduled by the network device is moo bits and is the same as the TBS #1.

After the terminal device receives the new data indication information #2, the terminal device compares the value of the new data indication information #2 with the value of the new data indication information #1, to determine that the value of the new data indication information #2 is the same as the value of the new data indication information #1. In this case, the terminal device considers that the network device fails to receive the data packet #1. In addition, because TBS #2=1000 bits=TBS #1, the terminal device may directly send the data packet #2 in the subframe #n+16 according to the instruction information #1.

FIG. 6 is another schematic diagram of behavior of the network device and the terminal device in a data transmission procedure according to an embodiment of the present invention.

As shown in FIG. 6, the terminal device sends, in a subframe #n, the data packet #3 corresponding to the HARQ process number #Ho, and the value of the new data indication information #3 corresponding to the data packet #3 is "0" (that is, NDI #3=0 shown in FIG. 6). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, the value of the new data indication information #1 corresponding to the data packet #1 is "1" (that is, NDI #1=1 shown in FIG. 6), and the TBS #1 corresponding to the data packet #1 is 1000 bits. The network device cannot detect the data packet #1. In addition, the network device schedules, in a subframe #n+12 by using the instruction information #1, the terminal device to send the data packet #2 in the subframe #n+16 (namely, the time unit #2) by using the HARQ process number #Ho.

In this case, because the network device does not detect the data packet #1, the network device determines the new data indication information #2 based on the data packet #3 and the corresponding new data indication information #3, in other words, the network device determines that the data packet #2 is an initially transmitted data packet of the data packet #3, and further determines that the value of the new data indication information #2 is "1" (that is, NDI #2=1 shown in FIG. 6), and the TBS #2 corresponding to the data packet #2 scheduled by the network device is woo bits and is the same as the TBS #1.

After the terminal device receives the new data indication information #2, the terminal device compares the value of the new data indication information #2 with the value of the new data indication information #1, to determine that the value of the new data indication information #2 is the same as the value of the new data indication information #1. In this case, the terminal device considers that the network device fails to receive the data packet #1. In addition, because TBS #2=1000 bits=TBS #1, the terminal device may directly send, in #n+16 according to the instruction information #1, the data packet #2, to serve as a retransmitted data packet of the data packet #1.

FIG. 7 is another schematic diagram of behavior of the network device and the terminal device in a data transmission procedure according to an embodiment of the present invention.

As shown in FIG. 7, the terminal device sends, in a subframe #n, the data packet #3 corresponding to the HARQ process number #Ho, and the value of the new data indication information #3 corresponding to the data packet #3 is "0" (that is, NDI #3=0 shown in FIG. 7). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, the value of the new data indication information #1 corresponding to the data packet #1 is "1" (that is, NDI #1=1 shown in FIG. 7), and the TBS #1 corresponding to the data packet #1 is 1000 bits. The network device cannot detect the data packet #1. In addition, the network device schedules, in a subframe #n+12 by using the instruction information #1, the terminal device to send the data packet #2 in a subframe #n+16 (namely, the time unit #2) by using the HARQ process number #Ho.

In this case, because the network device does not detect the data packet #1, the network device determines the new data indication information #2 based on the data packet #3 and the corresponding new data indication information #3, in other words, the network device determines that the data packet #2 is an initially transmitted data packet of the data packet #3, and further determines that the value of the new data indication information #2 is "1" (that is, NDI #2=1 shown in FIG. 7), and the TBS #2 corresponding to the data packet #2 scheduled by the network device is 500 bits.

After the terminal device receives the new data indication information #2, the terminal device compares the value of the new data indication information #2 with the value of the new data indication information #1, to determine that the value of the new data indication information #2 is the same as the value of the new data indication information #1. In this case, the terminal device considers that the network device fails to receive the data packet #1. In addition, because the TBS #1 is different from the TBS #2, the terminal device does not send the data packet #2 according to the instruction information #1, and does not occupy the subframe #n+16 to send data information.

Therefore, the terminal device sends a retransmitted data packet of the first data packet in the second time unit according to the first instruction information when the value of the first new data indication information is the same as the value of the second new data indication information and when the transport block size TBS corresponding to the first data packet is the same as the TBS corresponding to the second data packet. Therefore, not only current signaling can be effectively used, and signaling overheads are reduced, but also transmission efficiency of the first data packet can be effectively improved, and complexity of the terminal device is reduced.

By way of example rather than limitation, when the TBS #1 is different from the TBS #2, the terminal device may alternatively send the retransmitted data packet of the data packet #1 in the time unit #2 according to the instruction information #1.

Specifically, when the TBS #1 is greater than the TBS #2 indicated by instruction information #1, the data packet #1 may be divided, and transmission is performed based on the TBS #2 indicated by the instruction information #1. When the TBS #1 is less than the TBS #2 indicated by the instruction information #1, the data packet #1 and new data that is delivered from a higher layer may be reassembled into a new data packet, so that a TBS of the new data packet is the same as the TBS #2 indicated by the instruction information #1, and then the new data packet is transmitted. Further, a version number of a redundancy version (RV) of the retransmission is consistent with the RV version number corresponding to the data packet #1, and may be, for example, the RV #0.

It should be understood that, the terminal device may determine the TBS #2 based on the instruction information #1. The instruction information #1 indicates a physical resource and a modulation and coding scheme (MCS) that correspond to the data packet #2, and the TBS #2 may be obtained after mapping the physical resource and the MCS.

It should be understood that the terminal device may determine the TBS #1 based on configuration information (in other words, the foregoing control information) for configuring the data packet #1. The configuration information (in other words, the control information) includes information used to indicate a physical resource and an MCS that correspond to the data packet #1, and the TBS #1 may be obtained after mapping the physical resource and the MCS. Alternatively, the terminal device may autonomously determine the TBS #1, and the terminal device may report, to the network device, the TBS #1 or the physical resource and/or the MCS used to be mapped to the TBS. Optionally, the terminal device ignores the first instruction information when the value of the first new data indication information is the same as the value of the second new data indication information.

To be specific, the terminal device forbids or stops sending the data packet #2 according to the instruction information #1. In other words, the terminal device no longer performs packet assembly of the data packet #2 according to instruction of the instruction information #1, or the terminal device does not send the data packet #1 in the time unit #1 according to instruction of the instruction information #1.

In this embodiment of the present invention, the terminal device may retain or may not clear the data packet #1 in the HARQ buffer corresponding to the first HARQ process number when ignoring the instruction information #1.

It should be understood that when ignoring the instruction information #1, the terminal device may retransmit the data packet #1 based on other information or in another transmission manner as described above, and details are not described herein again.

In this embodiment of the present invention, when the terminal device ignores the instruction information #1, two cases in which the network device schedules, by using the instruction information #1, the terminal device to send the data packet #2 need to be considered, and the two cases may also correspond to the foregoing second case and third case of the state of receiving the data packet #1 by the network device. Details are as follows:

In the second case, to be specific, when the network device detects the data packet #1 and fails to receive the data packet #1, for example, the network device detects the data packet #1 but fails to demodulate and decode the data packet #1, the data packet #2 that the network device schedules the terminal device to send is a retransmitted data packet of the data packet #1. In this case, the network device may schedule, in two manners, the terminal device to send the retransmitted data packet of the data packet #1.

Manner 1

The network device schedules, by using semi-persistent UL grant information (denoted as semi-persistent UL grant information #2 for ease of distinguishing and understanding), the terminal device to send the retransmitted data packet of the data packet #1. Specifically, a value of new data indication information (denoted as new data indication information #5 for ease of distinguishing and understanding) in the semi-persistent UL grant information #2 is the second preset value (for example, an NDI in the semi-persistent UL grant information #2 is 1), the new data indication information #5 is used to instruct the terminal device to send the retransmitted data packet of the data packet #1. A function of the semi-persistent UL grant information #2 is similar to that of the semi-persistent UL grant information #1 used to schedule a retransmitted data packet of the data packet #4. The semi-persistent UL grant #2 is scrambled by using the RNTI #1.

In this case, the network device does not send the instruction information #1 and the new data indication information #2 to the terminal device to schedule the terminal device to retransmit the data packet #1, and the terminal device does not receive the instruction information #1 and the new data indication information #2.

If the network device always schedules a retransmitted data packet in Manner 1, as can be learned from the foregoing analysis on that the network device schedules, by using the instruction information #1, the terminal device to send the data packet #2, when the network device detects the existence of the data packet #1, the network device schedules, by using the semi-persistent UL grant information #2, the terminal device to retransmit the data packet #1. Therefore, the terminal device receives the instruction information #1 (and the new data indication information #2) definitely because of the third case, to be specific, because the network device does not detect the existence of the data packet #1 (the network device expects the data packet #2 that is scheduled by using the instruction information #1 and the new data indication information #2 to be an initially transmitted data packet). In other words, it may be determined that the network device does not detect the data packet #1. In this case, in consideration that a probability that the TBS #2 is the same as the TBS #1 is very small, for ease of implementation, the terminal device may directly ignore the instruction information #1.

Figure 8:
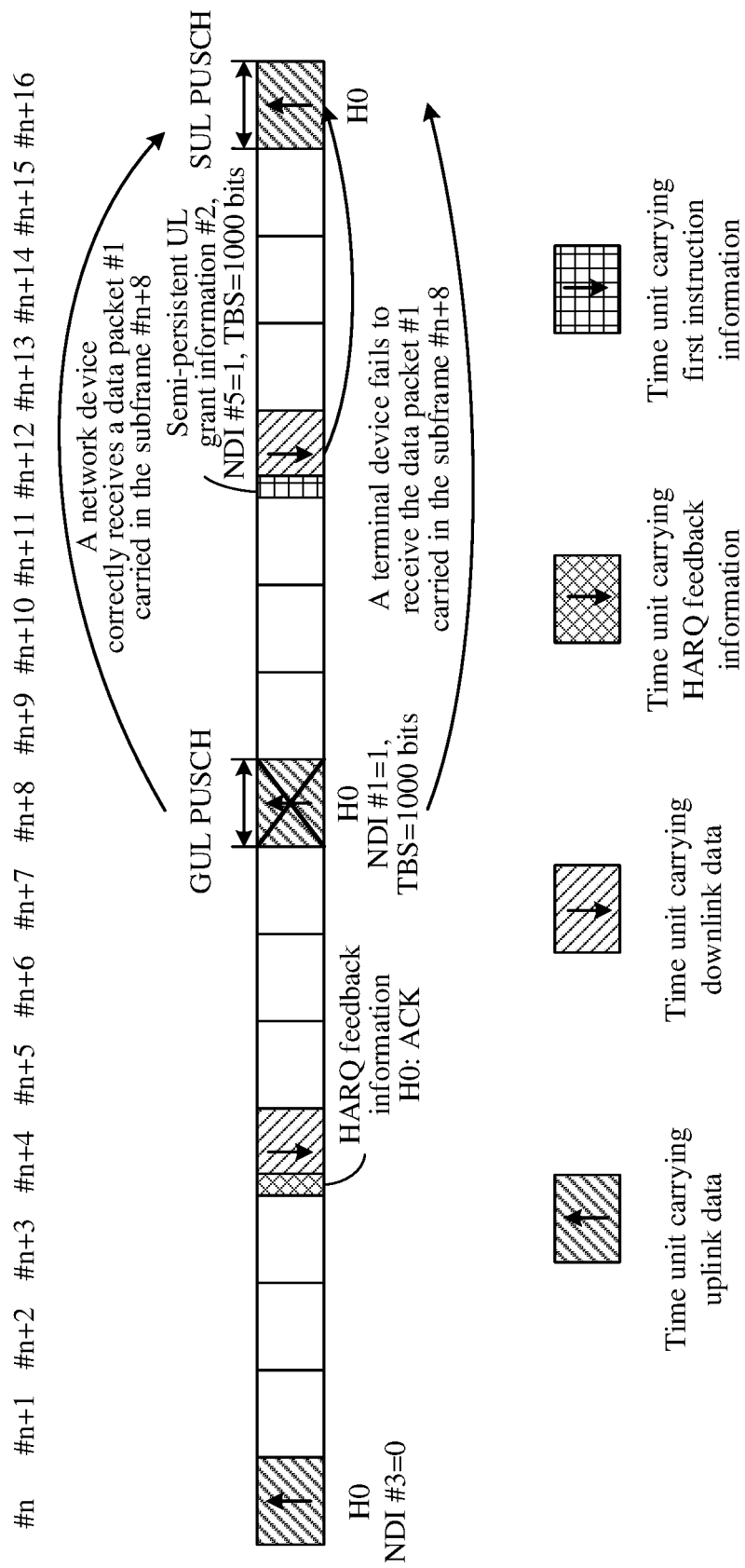

FIG. 8 is another schematic diagram of behavior of the network device and the terminal device in a data transmission procedure according to an embodiment of the present invention. To be specific, FIG. 8 is a schematic diagram of behavior of the network device and the terminal device in the procedure in which the network device schedules, in Manner 1, the terminal device to send the retransmitted data packet of the data packet #1 in the second case.

In FIG. 8, the terminal device sends, in a subframe #n, the data packet #3 corresponding to the HARQ process number #Ho, and the value of the new data indication information #3 corresponding to the data packet #3 is "0" (that is, NDI #3=0 shown in FIG. 8). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, the value of the new data indication information #1 corresponding to the data packet #1 is "1" (that is, NDI #1=1 shown in FIG. 8), and the TBS #1 corresponding to the data packet #1 is 1000 bits. In addition, for the first HARQ process number, the network device uses only the semi-persistent UL grant information #2 when scheduling the terminal device to perform single retransmission on a data packet corresponding to the first HARQ process number.

The network device detects the data packet #1, but fails to demodulate and decode the data packet #1. In addition, the network device schedules, in a subframe #n+12 by using the semi-persistent UL grant information #2, the terminal device to send the retransmitted data packet of the data packet #1 in a subframe #n+16 (namely, the time unit #2) by using the HARQ process number #Ho. In this case, the network device determines that the data packet #2 is the retransmitted data packet of the data packet #1, and the TBS #2 corresponding to the data packet #2 scheduled by the network device is 1000 bits and is the same as the TBS #1.

After the terminal device receives the semi-persistent UL grant information #2, the terminal device correctly considers that the network device detects the data packet #1 but does not successfully receive the data packet #1. In addition, because TBS #2=1000 bits=TBS #1, the terminal device directly sends the retransmitted data packet of the data packet #1 in #n+16 based on the semi-persistent UL grant information #2.

Manner 2

The network device schedules, by using the instruction information #1 and the new data indication information #2, the terminal device to retransmit the data packet #1.

The terminal device may distinguish a receiving state (a receiving success or a receiving failure) of the data packet #1 based on whether the value of the new data indication information #2 and the value of the new data indication information #1 are the same or different. Therefore, in the second case, the network device may also schedule retransmission of the data packet #1 in Manner 2.

If the network device always schedules the retransmitted data packet in Manner 2, in the second case, because the network device detects the existence of the data packet #1 (but does not successfully receive the data packet #1), the network device may obtain the TBS #1. Therefore, the TBS #2 corresponding to the data packet #2 scheduled by using the instruction information #1 sent by the network device is definitely the same as the TBS #1.

In the third case, to be specific, when the network device does not detect the data packet #1 and successfully receives the data packet #3, the network device sends the instruction information #1 and the new data indication information #2, and expects to schedule the terminal device to send an initially transmitted data packet different from the data packet #3 by using the first HARQ process number. In this case, because the network device does not know the existence of the data packet #1, the TBS #2 included in the instruction information #1 and the TBS #1 for the data packet #1 may be the same or may be different. When the TBS #1 is different from the TBS #2, the terminal device may determine that the network device does not detect the data packet #1.

Figure 9:
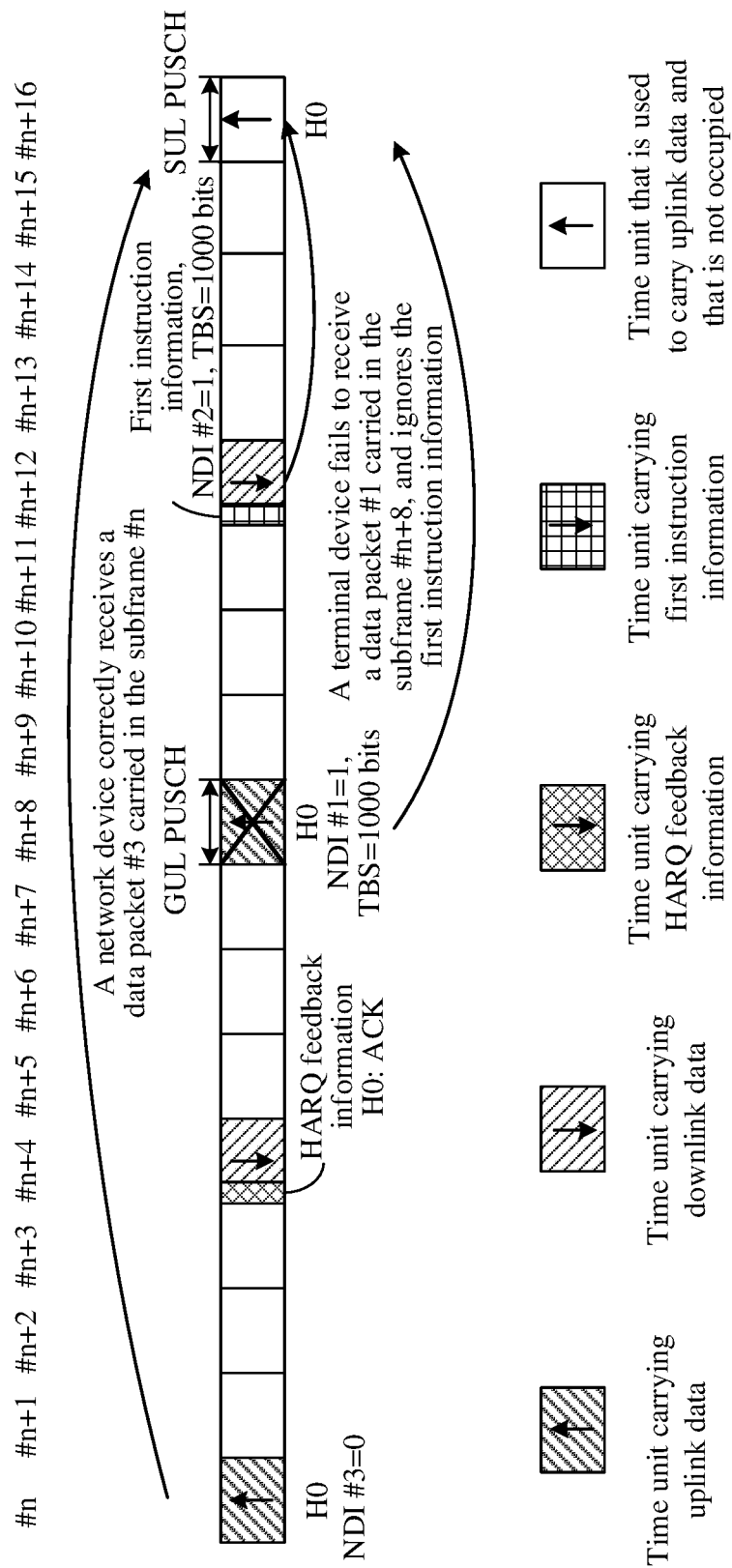
Figure 10:
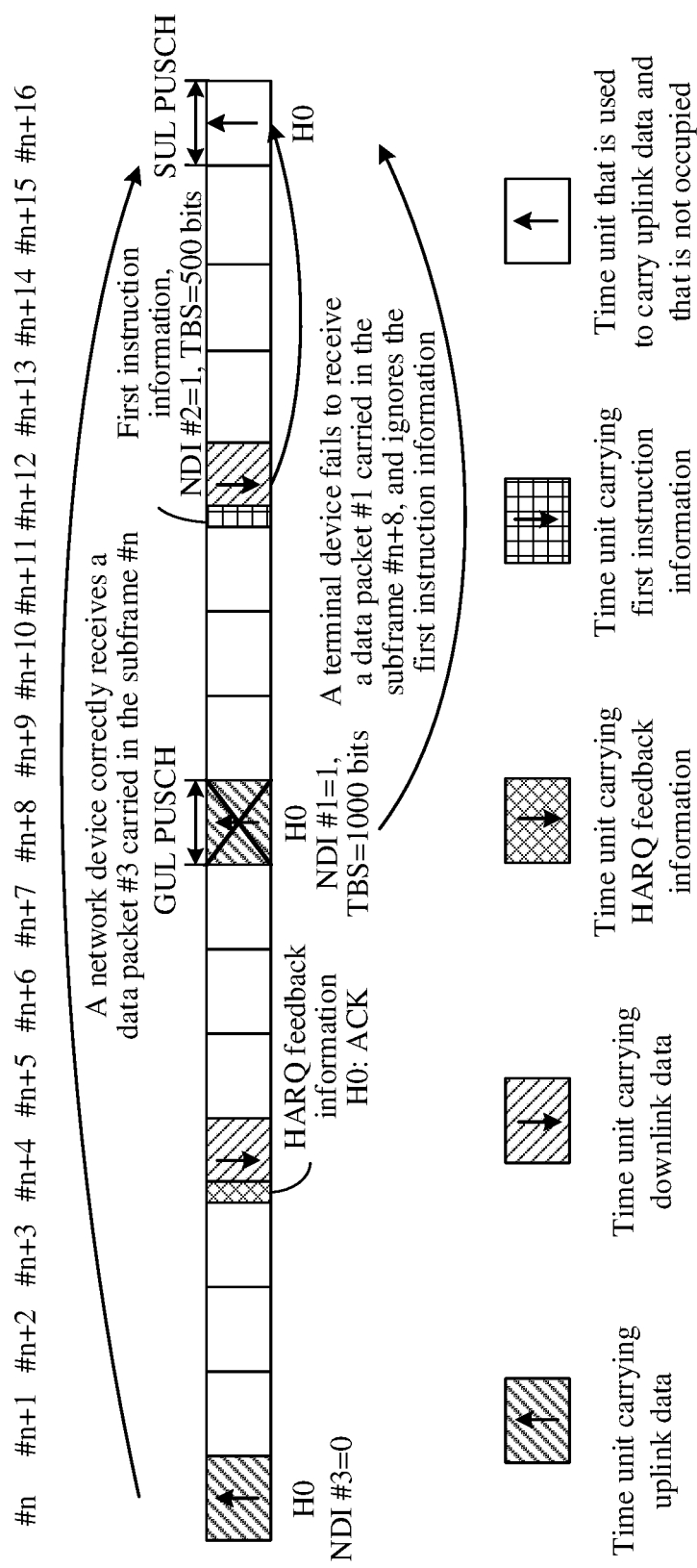

FIG. 9 and FIG. 10 are each another schematic diagram of behavior of the network device and the terminal device in a data transmission procedure according to an embodiment of the present invention. To be specific, FIG. 9 and FIG. 10 are each a schematic diagram of behavior of the network device and the terminal device in the procedure in which the network device schedules, in Manner 1 and Manner 2, the terminal device to send the retransmitted data packet of the data packet #1.

In FIG. 9 and FIG. 10, the terminal device sends, in a subframe #n, the data packet #3 corresponding to the HARQ process number #Ho, and the value of the new data indication information #3 corresponding to the data packet #3 is "0" (that is, NDI #3=0 shown in FIG. 9 and FIG. 10). The network device correctly receives the data packet #3, and indicates, by using HARQ feedback information, that a state of receiving the data packet #3 by the network device is an ACK. After receiving the HARQ feedback information, the terminal device sends, in a subframe #n+8 (namely, the time unit #1) in the GUL transmission manner, the data packet #1 corresponding to the HARQ process number #Ho, where the data packet #1 is an initially transmitted data packet different from the data packet #3, the value of the new data indication information #1 corresponding to the data packet #1 is "1" (that is, NDI #1=1 shown in FIG. 9 and FIG. 10), and the TBS #1 corresponding to the data packet #1 is 1000 bits. In addition, for the first HARQ process number, the network device uses only the semi-persistent UL grant information #2 when scheduling the terminal device to perform single retransmission on a data packet corresponding to the first HARQ process number.

In this case, the network device does not detect the data packet #1. In addition, the network device schedules, in a subframe #n+12 by using the instruction information #1, the terminal device to send the retransmitted data packet of the data packet #1 in a subframe #n+16 (namely, the time unit #2) by using the HARQ process number #Ho. Therefore, the network device determines the new data indication information #2 based on the data packet #3 and the corresponding new data indication information #3, in other words, the network device determines that the data packet #2 is an initially transmitted data packet of the data packet #3, and further determines that the value of the new data indication information #2 is "1" (that is, NDI #2=1 shown in FIG. 9 and FIG. 10). In FIG. 9, the TBS #2 corresponding to the data packet #2 scheduled by the network device is 1000 bits and is the same as the TBS #1. In FIG. 10, the TBS #2 corresponding to the data packet #2 scheduled by the network device is 500 bits.

After the terminal device receives the new data indication information #2, the terminal device compares the value of the new data indication information #2 with the value of the new data indication information #1, to determine that the value of the new data indication information #2 is the same as the value of the new data indication information #1. In this case, the terminal device considers that the network device fails to receive the data packet #1. In this case, regardless of the TBS #2 indicated in the instruction information #1, the network device uses only the semi-persistent UL grant information #2 to perform retransmission scheduling on the first HARQ process number. Therefore, the terminal device may consider that scheduling performed by the network device by using the instruction information #1 is an error, and therefore, the terminal device does not send the retransmitted data packet of the data packet #1 in the subframe #n+16 according to the instruction information #1, in other words, the terminal device ignores the instruction information #1.

In this case, the network device does not detect the data packet #1. In addition, the network device schedules, in the subframe #n+12 by using the instruction information #1, the terminal device to send the retransmitted data packet of the data packet #1 in the subframe #n+16 (namely, the time unit #2) by using the HARQ process number #Ho. Therefore, the network device determines the new data indication information #2 based on the data packet #3 and the corresponding new data indication information #3, in other words, the network device determines that the data packet #2 is an initially transmitted data packet of the data packet #3, and further determines that the value of the new data indication information #2 is "1" (that is, NDI #2=1 shown in FIG. 9 and FIG. 10). In FIG. 9, the TBS #2 corresponding to the data packet #2 scheduled by the network device is 1000 bits and is the same as the TBS #1. In FIG. 10, the TBS #2 corresponding to the data packet #2 scheduled by the network device is 500 bits.

After the terminal device receives the new data indication information #2, the terminal device compares the value of the new data indication information #2 with the value of the new data indication information #1, to determine that the value of the new data indication information #2 is the same as the value of the new data indication information #1. In this case, the terminal device considers that the network device fails to receive the data packet #1. In this case, regardless of the TBS #2 indicated in the instruction information #1, the network device uses only the semi-persistent UL grant information #2 to perform retransmission scheduling on the first HARQ process number. Therefore, the terminal device may consider that scheduling performed by the network device by using the instruction information #1 is an error, and therefore, the terminal device does not send the retransmitted data packet of the data packet #1 in the subframe #n+16 according to the instruction information #1, in other words, the terminal device ignores the instruction information #1.

Optionally, the terminal device ignores the first instruction information when the value of the first new data indication information is the same as the value of the second new data indication information and when the transport block size TBS corresponding to the first data packet is different from the TBS corresponding to the second data packet.

In other words, when determining to send the retransmitted data packet of the data packet #1, the terminal device ignores the instruction information #1 only when the TBS #2 is different from the TBS #1.

It should be understood that, in the second case, to be specific, when the network device detects the data packet #1 and fails to receive the data packet #1, the network device may alternatively schedule, in Manner 2, to be specific, by using the instruction information #1 and the new data indication information #2, the terminal device to retransmit the data packet #1. In this case, the TBS #2 is definitely the same as the TBS #1. In addition, the network device may alternatively schedule, in Manner 1, the terminal device to send the detected retransmitted data packet of the data packet #1, and schedules retransmission by using the instruction information #1 (and the new data indication information #2) when the network device does not detect the data packet #1. In this case, the TBS #2 and the TBS #1 may be the same or may be different. Regardless of either of the foregoing two manners, that the terminal device receives the instruction information #1 (and the new data indication information #2) may correspond to the second case of the network device (the network device actually intends to schedule retransmission), or may correspond to the third case of the network device (the network device does not detect the data packet #1 and intends to schedule initial transmission). In this case, to highly efficiently use resources, the terminal device does not need to distinguish between intentions of the network device, and it may be limited to that when the TBS #2 is the same as the TBS #1, the terminal device sends, according to the instruction information #1, the data packet #2 in the time unit #2, to serve as the retransmitted data packet of the data packet #1, as described above in FIG. 5 and FIG. 6. The TBS #1 corresponding to the data packet #1 is 1000 bits, and the TBS #2 corresponding to the data packet #2 is 1000 bits. Because the TBS #1 is the same as the TBS #2, the terminal device may directly send the data packet #2 in the subframe #n+16 (that is, the time unit #2) according to the instruction information #1. However, when the TBS #2 is different from the TBS #1, a resource scheduled by the network device matches the TBS #2 but does not match the TBS #1. Because the resource (in other words, the transmission format #2) indicated by the instruction information #1 cannot carry the TBS #1 in a matching manner, the instruction information #1 is ignored in this case, as described above in FIG. 7. The TBS #1 corresponding to the data packet #1 is 1000 bits, and the TBS #2 corresponding to the data packet #2 is 500 bits. Because the TBS #1 is different from the TBS #2, the terminal device ignores the instruction information #1, in other words, does not send the data packet #2 according to the instruction information #1.

Optionally, the terminal device returns the first data packet in the HARQ buffer corresponding to the first HARQ process number to a higher layer when the value of the first new data indication information is the same as the value of the second new data indication information.

In other words, the terminal device clears original data (namely, the data packet #1) in the HARQ buffer. Specifically, the terminal device may re-perform MAC layer packet assembly and perform new data transmission. In other words, the terminal device stores a new data packet (denoted as a data packet #5 for ease of distinguishing and understanding) in the HARQ buffer, and performs initial transmission on the data packet #5.

Optionally, the terminal device returns the first data packet in the HARQ buffer corresponding to the first HARQ process number to the higher layer when the value of the first new data indication information is the same as the value of the second new data indication information and the TBS #1 is different from TBS #2.

When the terminal device performs initial transmission on the new data packet #5 corresponding to the first HARQ process number, the terminal device may perform initial transmission on the data packet #5 corresponding to the first HARQ process number in the time unit #2 according to the instruction information #1.

In addition, the terminal device may also perform initial transmission on the data packet #4 in the HARQ buffer in another transmission manner including by using other dynamic UL grant information or a new GUL PUSCH other than the instruction information #1.

Optionally, the method further includes: determining, by the terminal device, the value of the first new data indication information based on a transmission relationship between a third data packet and the first data packet and a value of third new data indication information corresponding to the third data packet, where the transmission relationship includes: the third data packet being an initially transmitted data packet different from the first data packet, or the third data packet being a retransmitted data packet of the first data packet, the third new data indication information is used to indicate whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in terms of time.

Optionally, the terminal device determines the value of the first new data indication information based on the transmission relationship between the third data packet and the first data packet and the value of the third new data indication information corresponding to the third data packet.

To be specific, the new data indication information #1 is determined by the terminal device and sent to the network device. In this case, when determining the value of the new data indication information #1, the terminal device needs to determine the value of the new data indication information #1 based on the transmission relationship between the data packet #1 and a data packet (namely, the third data packet, denoted as a data packet #3) that is sent by the terminal device or scheduled by the network device before the time unit #2 and the new data indication information #3 (namely, an example of the third new data indication information) corresponding to the data packet #3. It should be noted that the data packet #3 herein and the data packet #3 described above are a same data packet. Similarly, the new data indication information #3 herein and the new data indication information #3 described above are also a same data packet.

In this embodiment of the present invention, the terminal device needs to determine the transmission relationship between the data packet #3 and the data packet #1 before determining the value of the new data indication information #1. A specific manner may be described as follows.

For example, the terminal device may determine, based on indication information that is fed back by the network device for a HARQ receiving state of the data packet #3, the transmission relationship: the third data packet being an initially transmitted data packet different from the first data packet, or the third data packet being a retransmitted data packet of the first data packet. In other words, the terminal device determines, based on the information that is fed back by the network device for the HARQ receiving state of the data packet #3, a state of receiving the data packet #3 by the network device.

For another example, the terminal device may determine the transmission relationship based on the UL grant information sent by the network device. In other words, the terminal device may determine the HARQ receiving state of the network device for the data packet #3 (to be specific, whether the network device successfully receives the data packet #3) based on the UL grant information sent by the network device. Specifically, when the UL grant information schedules the terminal device to retransmit the data packet #3, the data packet #1 is a retransmitted data packet of the data packet #3; or when the UL grant information schedules the terminal device to perform initial transmission on the data packet #3, the data packet #1 is an initially transmitted data packet different from the data packet #3.

For another example, the terminal device may determine the transmission relationship based on the HARQ feedback information sent by the network device. Descriptions of the HARQ feedback information are the same as the foregoing descriptions, and details are not described again. Specifically, when the HARQ receiving state that is in the HARQ feedback information sent by the network device and that corresponds to the data packet #3 (in other words, the first HARQ process) is an ACK, the data packet #1 is an initially transmitted data packet different from the data packet #3; or when the HARQ receiving state that is in the HARQ feedback information sent by the network device and that corresponds to the data packet #3 (in other words, the first HARQ process) is an NACK, the data packet #1 is a retransmitted data packet of the data packet #3.

Optionally, a procedure in which the terminal device determines the value of the new data indication information #1 based on the transmission relationship between the data packet #3 and the data packet #1 and the value of the new data indication information #3 is as follows: determining, by the terminal device when the first data packet is a retransmitted data packet of the third data packet, that the value of the first new data indication information is the same as the value of the third new data indication information; or determining, by the terminal device when the first data packet is an initially transmitted data packet different from the third data packet, that the value of the first new data indication information is different from the value of the third new data indication information.

In terms of a property of the data packet #3, the data packet #3 may be a data packet scheduled by the network device, to be specific, the data packet #3 is a data packet that the network device schedules the terminal device to send in a time unit #3 (namely, an example of the third time unit). The terminal device may send the data packet #3 or may not send the data packet #3 based on an actual situation or some special considerations (for example, the terminal device does not successfully send the data packet #3 because the terminal device does not preempt a channel due to a failure in LBT). In all cases, the terminal device may determine the new data indication information #1 based on the data packet #3 and the value of the new data indication information #3.

It should be noted that when the data packet #3 is a data packet scheduled by the network device, but the terminal device does not send the data packet #3 and directly sends the data packet #1 in the time unit #1, the data packet #3 and the data packet #1 are a same data packet, in other words, the data packet #3 and the data packet #1 correspond to a same uncoded transport block.

For sending the data packet #3 by the terminal device, the data packet #3 is a data packet sent by the terminal device in the time unit #3, and the terminal device may send the data packet #3 in two manners: Manner A and Manner B.

Manner A

The data packet #3 is sent by the terminal device to the network device in the GUL transmission manner, and the new data indication information #3 is sent by the terminal device to the network device.

Herein, the transmission manner of the data packet #3 is the same as the transmission manner of the data packet #1. Details are not described herein again.

In this case, the terminal device may determine the value of the new data indication information #1 based on only the transmission relationship between the data packet #1 and the data packet #3 that is sent in the GUL transmission manner and the value of the new data indication information #3. To be specific, if the data packet #3 is sent by the terminal device to the network device in another transmission manner, the terminal device does not determine the value of the new data indication information #1 based on the data packet #3 sent in the another transmission manner and the value of the corresponding new data indication information #3.

Manner B

The data packet #3 is sent by the terminal device to the network device based on scheduling of the network device, and the new data indication information #3 is sent by the network device to the terminal device.

The transmission manner based on scheduling of the network device may also be referred to as SUL transmission. The SUL transmission includes two manners. One manner is that the network device performs scheduling by using dynamic UL grant information. The other manner is that the network device performs scheduling by using semi-persistent UL grant information, the semi-persistent UL grant information is scrambled by using the RNTI #1, and this manner is similar to a manner of scheduling retransmission by using the semi-persistent UL grant information #1 and the semi-persistent UL grant information #2.

In this case, the terminal device may determine the value of the new data indication information #1 based on only the transmission relationship between the data packet #1 and the data packet #3 sent based on SUL transmission and the value of the corresponding new data indication information #3. To be specific, if the data packet #3 is sent by the terminal device to the network device in another transmission manner, the terminal device does not determine the value of the new data indication information #2 based on the data packet #3 sent in the another transmission manner and the value of the corresponding new data indication information #3. It should be understood that the data packet #3 transmitted based on SUL transmission may be limited only to a data packet actually sent by the terminal device, or may not be limited to a data packet actually sent by the terminal device. For example, the data packet #3 may include a data packet that the network device schedules the terminal device to send, but is not actually sent by the terminal device.

Optionally, the data packet #3 is a previous data packet that the network device schedules, before the time unit #1, the terminal device to send and that corresponds to the first HARQ process number.

Optionally, the data packet #3 is a previous data packet that is sent by the terminal device before the time unit #1 and that corresponds to the first HARQ process number.

Optionally, the data packet #3 is a latest data packet that corresponds to the first HARQ process number before the time unit #1. In other words, the data packet #3 is a latest data packet that is sent by the terminal device after the time unit #3 and that corresponds to the first HARQ process number.

In other words, the time unit #3 is a latest time unit that corresponds to the first HARQ process number and that is located before the time unit #1 in terms of time.

In this way, for the data packet #3, regardless of whether the data packet #3 is sent by the terminal device in the GUL transmission manner or is sent by the terminal device under scheduling of the network device, the terminal device determines the value of the new data indication information #2 based on the latest data packet (denoted as a previous data packet of the data packet #1 for ease of description subsequently) and corresponding new data indication information.

It may also be understood as that the terminal device may alternatively determine the new data indication information #2 based on the transmission relationship between the data packet #1 and the previous data packet of the data packet #1 and the corresponding new data indication information, that is, the previous data packet is a data packet whose transmission manner is not limited.

For example, when the previous data packet of the data packet #1 is a data packet that is sent in the GUL transmission manner (namely, Manner A) and that corresponds to the first HARQ process number, the terminal device determines the value of the new data indication information #2 based on the transmission relationship between the data packet #1 and the previous data packet that is sent in the GUL transmission manner and a value of the new data indication information corresponding to the previous data packet.

For another example, when the previous data packet of the data packet #1 is a data packet that is based on scheduling of the network device and that corresponds to the first HARQ process, the terminal device determines the value of the new data indication information #2 based on the transmission relationship between the data packet #1 and the previous data packet that is based on scheduling of the network device and the value of the new data indication information corresponding to the previous data packet. Optionally, the previous data packet is limited only to a data packet that is actually sent by the terminal device. To be specific, when the previous data packet of the data packet #1 is based on scheduling of the network device, is actually sent by the terminal device, and corresponds to the first HARQ process, the terminal device determines the value of the new data indication information #2 based on the transmission relationship between the data packet #1 and the previous data packet that is based on scheduling of the network device and that is actually sent by the terminal device and the value of the new data indication information corresponding to the previous data packet. Optionally, the previous data packet is not limited to a data packet actually sent by the terminal device. For example, the previous data packet may alternatively be a data packet that the network device schedules the terminal device to send, but is not actually sent by the terminal device.

A procedure in which the terminal device determines the value of the new data indication information #1 based on the transmission relationship between the data packet #3 and the data packet #1 and the value of the new data indication information #3 is described in detail in the following with reference to FIG. 11 and FIG. 12.

Figure 11:
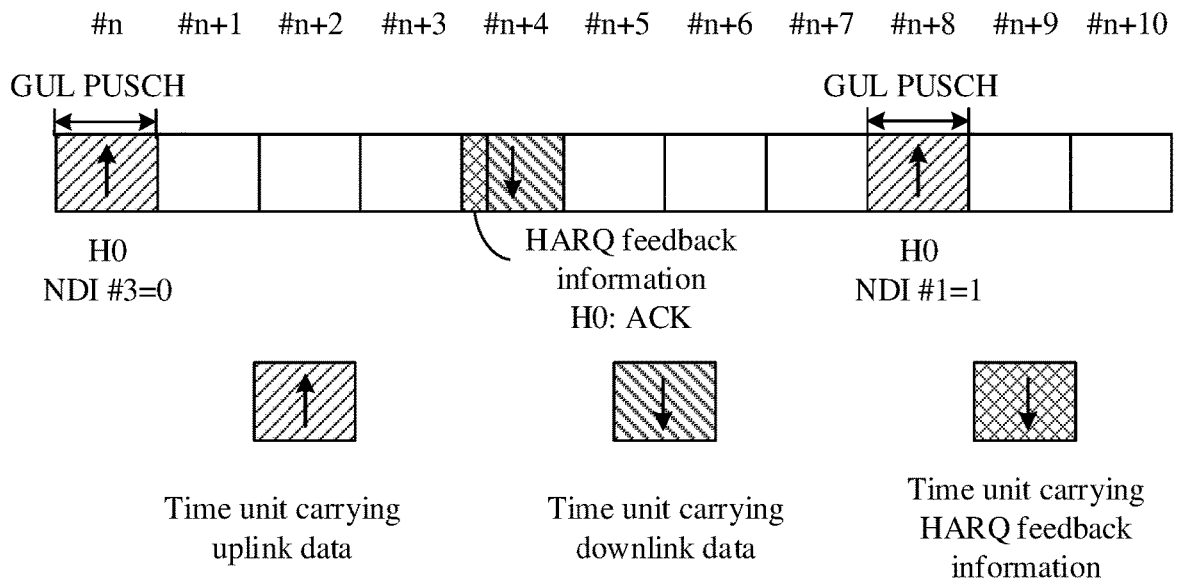

FIG. 11 is another schematic diagram of behavior of the network device and the terminal device in a data transmission procedure according to an embodiment of the present invention.

The terminal device sends, in a subframe #n, the data packet #3 corresponding to the first HARQ process number (namely, a HARQ process number #Ho) in the GUL transmission manner, and the value of the new data indication information #3 corresponding to the data packet #3 is "0" (that is, NDI #3=0 shown in FIG. 11). The network device correctly receives the data packet #3, and indicates, by using HARQ feedback information corresponding to the data packet #3, that a state of receiving the data packet #3 by the network device is an ACK. After the terminal device receives the HARQ feedback information, the terminal device determines that the transmission relationship between the data packet #3 and the data packet #1 that is sent in a subframe #n+8 (namely, the time unit #1) is that the data packet #1 is an initially transmitted data packet different from the data packet #3, and determines that the value of the new data indication information #1 corresponding to the data packet #1 is different from that of the new data indication information #3. To be specific, the value of the new data indication information #1 is "1" (that is, NDI #1=1 shown in FIG. 11). In addition, the terminal device sends, in the subframe #n+8 in the GUL transmission manner, the data packet #1 corresponding to the HARQ process number #Ho.

Figure 12:
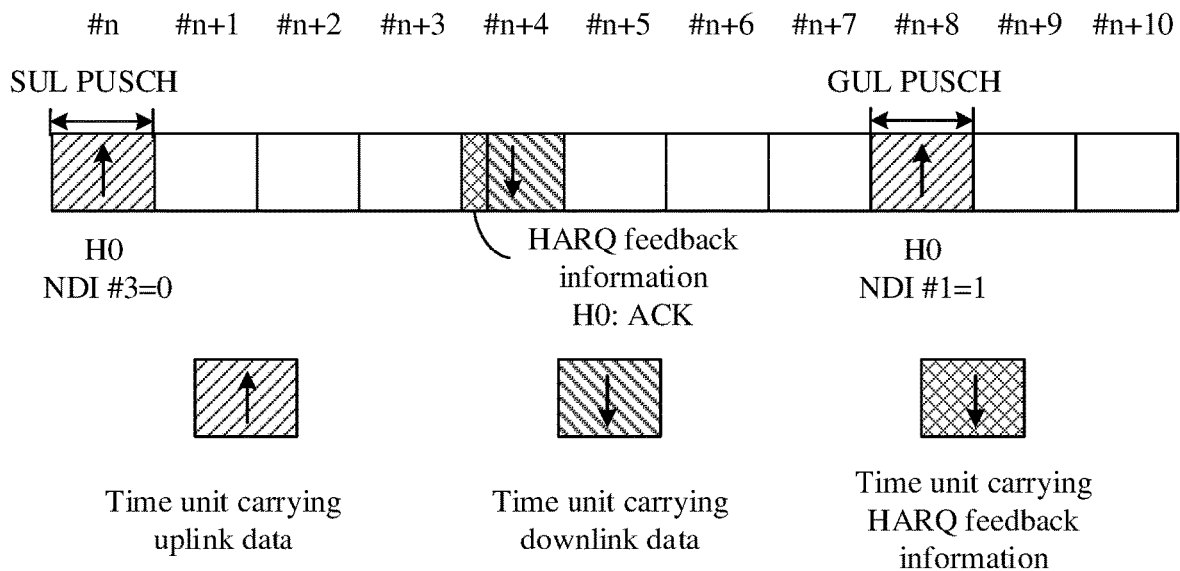

FIG. 12 is still another schematic diagram of behavior of the network device and the terminal device in a data transmission procedure according to an embodiment of the present invention.

The terminal device sends, in a subframe #n, the data packet #3 corresponding to the first HARQ process number (namely, the HARQ process number #Ho) in the SUL transmission manner (to be specific, based on scheduling of the network device), and the value of the new data indication information #3 corresponding to the data packet #3 is "0" (that is, NDI #3=0 shown in FIG. 12). The network device correctly receives the data packet #3, and indicates, by using HARQ feedback information corresponding to the data packet #3, that a state of receiving the data packet #3 by the network device is an ACK. After the terminal device receives the HARQ feedback information, the terminal device determines that the transmission relationship between the data packet #3 and the data packet #1 that is sent in a subframe #n+8 (namely, the time unit #1) is that the data packet #1 is an initially transmitted data packet different from the data packet #3, and determines that the value of the new data indication information #1 corresponding to the data packet #1 is different from that of the new data indication information #3. To be specific, the value of the new data indication information #1 is "1" (that is, NDI #1=1 shown in FIG. 12). In addition, the terminal device sends the data packet #1 corresponding to the HARQ process number #Ho in the subframe #n+8 in the GUL transmission manner.

In conclusion, it may be further learned from descriptions in FIG. 11 and FIG. 12 that the terminal device may determine the new data indication information #2 based on the previous data packet of the data packet #1 and the corresponding new data indication information. In other words, the previous data packet is a data packet whose transmission manner is not limited.

Therefore, according to the data transmission method provided in this embodiment of the present invention, after receiving the first instruction information used to instruct the terminal device to send the second data packet corresponding to the first HARQ process number, the terminal device performs buffering processing on the first data packet or determines a transmission type of the second data packet, based on the value of the second new data indication information corresponding to the second data packet and the value of the first new data indication information corresponding to the first data packet that is sent by the terminal device through GUL transmission, to send the second data packet, where the second data packet is a retransmitted data packet of the first data packet, or the second data packet is an initially transmitted data packet different from the first data packet. Particularly, when the network device does not detect the first data packet, and when the network device instructs, by using the first instruction information, the terminal device to transmit an initially transmitted data packet corresponding to the first HARQ process number, the terminal device no longer transmits the initially transmitted data packet according to the first instruction information, but sends a retransmitted data packet of the first data packet, and no longer clears the first data packet in the buffer, but retains the first data packet in the buffer. Therefore, a loss of the first data packet is reduced, data transmission reliability is improved, and system flexibility is also improved.

In addition, when sending the retransmitted data packet of the first data packet, the terminal device may directly retransmit the first data packet in the second time unit according to instruction of the first instruction information, thereby effectively using current signaling and reducing signaling overheads.

Moreover, the terminal device sends the retransmitted data packet of the first data packet in the second time unit according to the first instruction information when the value of the first new data indication information is the same as the value of the second new data indication information and when the transport block size (TBS) corresponding to the first data packet is the same as the TBS corresponding to the second data packet. Therefore, not only current signaling can be effectively used and signaling overheads are reduced, but also transmission efficiency of the first data packet can be effectively improved and complexity of the terminal device is reduced.

The data transmission method according to the embodiments of the present invention is described above in detail with reference to FIG. 1 to FIG. 12, and a data transmission apparatus according to the embodiments of the present invention is described below with reference to FIG. 13 and FIG. 14. Technical features described in the method embodiment are also applicable to the following apparatus embodiments.

Figure 13:
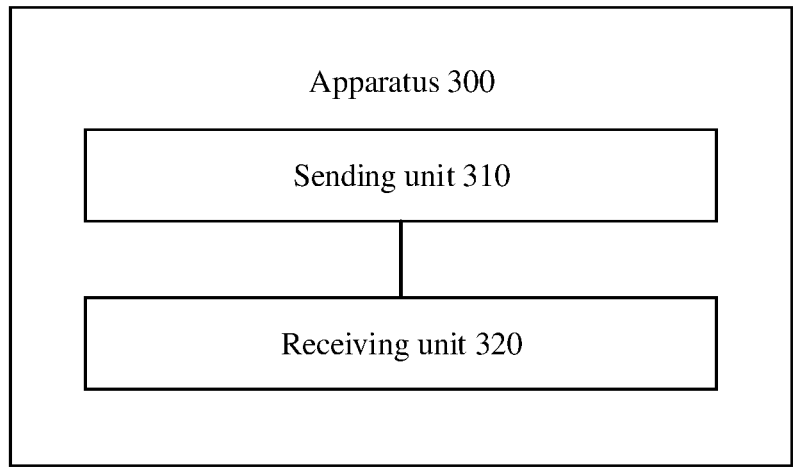
FIG. 13 is a schematic block diagram of a data transmission apparatus according to an embodiment of the present invention.

FIG. 13 is a schematic block diagram of a data transmission apparatus 300 according to an embodiment of the present invention. As shown in FIG. 13, the apparatus 300 includes: a sending unit 310, configured to send a first data packet to a network device in a first time unit in a grant free uplink GUL transmission manner, where the first data packet corresponds to a first hybrid automatic repeat request HARQ process number, the first data packet corresponds to first new data indication information, and the first new data indication information is used to indicate whether the first data packet is an initially transmitted data packet or a retransmitted data packet; and a receiving unit 320, configured to receive first instruction information sent by the network device, where the first instruction information is used to instruct the apparatus to send a second data packet in a second time unit, the second data packet corresponds to the first HARQ process number, the second time unit is located after the first time unit in terms of time, the second data packet corresponds to second new data indication information sent by the network device, and the second new data indication information is used to indicate whether the second data packet is an initially transmitted data packet or a retransmitted data packet, where the sending unit 310 is further configured to perform buffering processing on the first data packet or send the second data packet, based on a value of the first new data indication information and a value of the second new data indication information, where the second data packet is a retransmitted data packet of the first data packet, or the second data packet is an initially transmitted data packet different from the first data packet.

Therefore, according to the data transmission apparatus provided in this embodiment of the present invention, after receiving the first instruction information used to instruct the apparatus to send the second data packet corresponding to the first HARQ process number, the apparatus performs buffering processing on the first data packet or determines a transmission type of the second data packet, based on the value of the second new data indication information corresponding to the second data packet and the value of the first new data indication information corresponding to the first data packet that is sent by the apparatus through GUL transmission, to send the second data packet, where the second data packet is a retransmitted data packet of the first data packet, or the second data packet is an initially transmitted data packet different from the first data packet. Particularly, when the network device does not detect the first data packet, and when the network device instructs, by using the first instruction information, the apparatus to transmit an initially transmitted data packet corresponding to the first HARQ process number, the apparatus no longer transmits the initially transmitted data packet according to the first instruction information, but sends a retransmitted data packet of the first data packet, and no longer clears the first data packet in the buffer, but retains the first data packet in the buffer. Therefore, a loss of the first data packet is reduced, data transmission reliability is improved, and system flexibility is also improved.

Optionally, the sending unit 310 is specifically configured to: retain the first data packet in a buffer or send the second data packet, when the value of the first new data indication information is the same as the value of the second new data indication information, where the second data packet is a retransmitted data packet of the first data packet.

Optionally, the sending unit 310 is specifically configured to: send the second data packet in the second time unit according to the first instruction information.

Therefore, when sending the retransmitted data packet of the first data packet, the apparatus may directly retransmit the first data packet in the second time unit according to instruction of the first instruction information, thereby effectively using current signaling and reducing signaling overheads.

Optionally, the sending unit 310 is specifically configured to: send the second data packet in the second time unit according to the first instruction information when the value of the first new data indication information is the same as the value of the second new data indication information and when a transport block size (TBS) corresponding to the first data packet is the same as a TBS corresponding to the second data packet, where the second data packet is a retransmitted data packet of the first data packet.

Therefore, the apparatus sends the retransmitted data packet of the first data packet in the second time unit according to the first instruction information when the value of the first new data indication information is the same as the value of the second new data indication information and when the transport block size (TBS) corresponding to the first data packet is the same as the TBS corresponding to the second data packet. Therefore, not only current signaling can be effectively used, and signaling overheads are reduced, but also transmission efficiency of the first data packet can be effectively improved, and complexity of the apparatus is reduced.

Optionally, the apparatus further includes: a processing unit 330, configured to ignore the first instruction information when the value of the first new data indication information is the same as the value of the second new data indication information.

Optionally, the apparatus further includes: a processing unit 330, configured to ignore the first instruction information when the value of the first new data indication information is the same as the value of the second new data indication information and when the transport block size (TBS) corresponding to the first data packet is different from the TBS corresponding to the second data packet.

Optionally, the sending unit 310 is specifically configured to: send the second data packet in the second time unit according to the first instruction information when the value of the first new data indication information is different from the value of the second new data indication information, where the second data packet is an initially transmitted data packet different from the first data packet.

Optionally, the apparatus further includes: the processing unit 330, configured to determine the value of the first new data indication information based on a transmission relationship between a third data packet and the first data packet and a value of third new data indication information corresponding to the third data packet, where the transmission relationship includes: the third data packet being an initially transmitted data packet different from the first data packet, or the third data packet being a retransmitted data packet of the first data packet, the third new data indication information is used to indicate whether the third data packet is an initially transmitted data packet or a retransmitted data packet, the third data packet is a data packet that the network device schedules the apparatus to send in a third time unit, the third data packet corresponds to the first HARQ process number, and the third time unit is located before the first time unit in terms of time.

Optionally, the processing unit 330 is specifically configured to: when the first data packet is a retransmitted data packet of the third data packet, determine that the value of the first new data indication information is the same as the value of the third new data indication information; or when the first data packet is an initially transmitted data packet different from the third data packet, determine that the value of the first new data indication information is different from the value of the third new data indication information.

Optionally, the receiving unit 320 is further configured to: receive control information sent by the network device, where the control information includes fourth new data indication information, and a value of the fourth new data indication information is a first preset value when the control information is used to activate or reactivate the terminal device to send information in the GUL transmission manner; and the apparatus further includes: the processing unit 330, configured to determine, based on the control information, a semi-persistent time domain resource corresponding to the GUL transmission manner, where the first time unit belongs to the semi-persistent time domain resource.

Optionally, the value of the fourth new data indication information is a second preset value when the control information is used to schedule a retransmitted data packet of a fourth data packet, the fourth data packet is a data packet sent by the apparatus in the GUL transmission manner, and the second preset value is different from the first preset value.

Optionally, the sending unit 310 is further configured to: send the first new data indication information to the network device.

The data transmission apparatus 300 may correspond to the terminal device described in the foregoing method 200 (for example, the data transmission apparatus 300 may be configured as the terminal device or may be the terminal device), and modules or units in the data transmission apparatus 300 are separately configured to perform actions or processing procedures performed by terminal device in the foregoing method 200. To avoid repetition, details are not described herein again.

In this embodiment of the present invention, the apparatus 300 may include: a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

The sending unit 310 in the apparatus 300 shown in FIG. 13 may correspond to the transmitter, the receiving unit 320 in the apparatus 300 shown in FIG. 13 may correspond to the receiver, and the processing unit 330 in the apparatus 300 shown in FIG. 13 may correspond to the processor. In another implementation, the transmitter and the receiver may be implemented by a same component: a transceiver.

It should be noted that, the foregoing method embodiments in the embodiments of the present invention may be applied to a processor, or implemented by a processor. The processor may be an integrated circuit chip and has a signal processing capability. In an implementation procedure, steps in the foregoing method embodiments may be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. The steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

Figure 14:
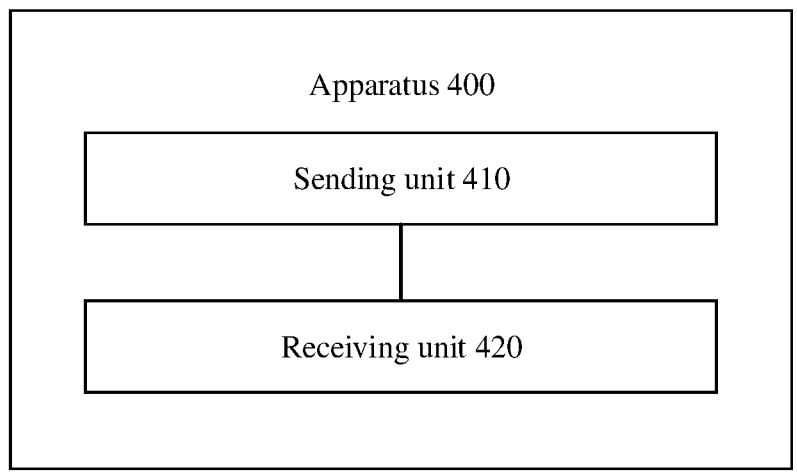
FIG. 14 is a schematic block diagram of a data transmission apparatus according to an embodiment of the present invention.

FIG. 14 is a schematic block diagram of a data transmission apparatus 400 according to an embodiment of the present invention. As shown in FIG. 14, the apparatus 400 includes: a sending unit 410, configured to send first instruction information to a terminal device, where the first instruction information is used to instruct the terminal device to send a second data packet in a second time unit, the second data packet corresponds to a first HARQ process number, the second data packet corresponds to second new data indication information sent by the apparatus, the second new data indication information is used to indicate whether the second data packet is an initially transmitted data packet or a retransmitted data packet, the first HARQ process number further corresponds to a first data packet, the first data packet is sent by the terminal device to the apparatus in a first time unit in a GUL transmission manner, the first data packet corresponds to first new data indication information, the first new data indication information is used to indicate whether the first data packet is an initially transmitted data packet or a retransmitted data packet, and the second time unit is located after the first time unit in terms of time; and a receiving unit 420, configured to receive the second data packet sent by the terminal device, where the second data packet is a retransmitted data packet of the first data packet, or the second data packet is an initially transmitted data packet different from the first data packet.

Therefore, according to the data transmission apparatus in this embodiment of the present invention, after the apparatus sends the first instruction information used to instruct the terminal device to send the second data packet corresponding to the first HARQ process number, the terminal device may be enabled to perform buffering processing on the first data packet or determine a type of the second data packet, based on the value of the second new data indication information corresponding to the second data packet and the value of the first new data indication information corresponding to the first data packet that is sent by the terminal device through GUL transmission, to send the second data packet, where the second data packet is a retransmitted data packet of the first data packet, or the second data packet is an initially transmitted data packet different from the first data packet. Particularly, when the apparatus does not detect the first data packet, and when the apparatus instructs, by using the first instruction information, the terminal device to transmit an initially transmitted data packet corresponding to the first HARQ process number, the terminal device may be enabled to: no longer transmit the initially transmitted data packet according to the first instruction information, but send a retransmitted data packet of the first data packet, and no longer clear the first data packet in a buffer, but retain the first data packet in the buffer. Therefore, a loss of the first data packet is reduced, data transmission reliability is improved, and system flexibility is also improved.

Optionally, the second data packet is a retransmitted data packet of the first data packet when a value of the first new data indication information is the same as a value of the second new data indication information.

Optionally, the second data packet is a data packet sent by the terminal device in the second time unit.

Optionally, when the value of the first new data indication information is the same as the value of the second new data indication information and when a transport block size (TBS) corresponding to the first data packet is the same as a TBS corresponding to the second data packet, the second data packet is a data packet sent by the terminal device in the second time unit.

Optionally, the second data packet is an initially transmitted data packet different from the first data packet when the value of the first new data indication information is different from the value of the second new data indication information.

Optionally, when the first data packet is a retransmitted data packet of a third data packet, the value of the first new data indication information is the same as a value of third new data indication information corresponding to the third data packet, where the third new data indication information is used to indicate whether the third data packet is an initially transmitted data packet or a retransmitted data packet, the third data packet is a data packet that the apparatus schedules the terminal device to send in a third time unit, the third data packet corresponds to the first HARQ process number, and the third time unit is located before the first time unit in terms of time; or when the first data packet is an initially transmitted data packet different from a third data packet, the value of the first new data indication information is different from a value of third new data indication information corresponding to the third data packet, where the third new data indication information is used to indicate whether the third data packet is an initially transmitted data packet or a retransmitted data packet, the third data packet is a data packet that the apparatus schedules the terminal device to send in a third time unit, the third data packet corresponds to the first HARQ process number, and the third time unit is located before the first time unit in terms of time.

Optionally, the apparatus further includes: a processing unit 430, configured to determine the second new data indication information based on a receiving state of the first data packet and the first new data indication information when the apparatus detects the first data packet.

Optionally, the sending unit 410 is further configured to: send control information to the terminal device, where the control information includes fourth new data indication information, a value of the fourth new data indication information is a first preset value when the control information is used to activate or reactivate the terminal device to send information in the GUL transmission manner, and the first time unit belongs to a semi-persistent time domain resource corresponding to the GUL transmission manner.

Optionally, the value of the fourth new data indication information is a second preset value when the control information is used to schedule a retransmitted data packet of a fourth data packet, the fourth data packet is a data packet sent by the terminal device in the GUL transmission manner, and the second preset value is different from the first preset value.

Optionally, the receiving unit 410 is further configured to: receive the first new data indication information sent by the terminal device.

The data transmission apparatus 400 may correspond to the network device described in the foregoing method 200 (for example, the data transmission apparatus 400 may be configured as the network device or may be the network device), and modules or units in the data transmission apparatus 400 are separately configured to perform actions or processing procedures performed by network device in the foregoing method 200. To avoid repetition, details are not described herein again.

In this embodiment of the present invention, the apparatus 400 may include: a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

The sending unit 410 in the apparatus 400 shown in FIG. 14 may correspond to the transmitter, the receiving unit 420 in the apparatus 400 shown in FIG. 14 may correspond to the receiver, and the processing unit 430 in the apparatus 400 shown in FIG. 14 may correspond to the processor. In another implementation, the transmitter and the receiver may be implemented by a same component: a transceiver.

It should be noted that, the foregoing method embodiments in the embodiments of the present invention may be applied to a processor, or implemented by a processor. The processor may be an integrated circuit chip and has a signal processing capability. In an implementation process, steps in the foregoing method embodiments may be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. The steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

It should be understood that sequence numbers of the foregoing procedures do not mean execution sequences in various embodiments in the embodiments of the present invention. The execution sequences of the procedures should be determined based on functions and internal logic of the procedures, and should not be construed as any limitation on the implementation procedures of the embodiments of the present invention.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of the embodiments of the present invention.

A person skilled in the art may clearly understand that, for convenience and brevity of description, for specific working procedures of the system, apparatus, and units described in the foregoing, refer to corresponding procedures in the foregoing method embodiments. Details are not described herein again.

In the several embodiments provided in the embodiments of the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
sending, by a terminal device, grant free uplink control information (G-UCI), wherein the G-UCI includes first new data indication information;
sending, by a terminal device, a first data packet to a network device in a first time unit and in a grant free uplink (GUL) transmission manner, wherein the first data packet corresponds to a first hybrid automatic repeat request (HARQ) process number, the first data packet corresponds to the first new data indication information, and the first new data indication information indicates whether the first data packet is an initially transmitted data packet or a retransmitted data packet;
receiving, by the terminal device, first instruction information sent by the network device, wherein the first instruction information instructs the terminal device to send a second data packet in a second time unit, the second data packet corresponds to the first HARQ process number, the second time unit is located after the first time unit in time, the second data packet corresponds to second new data indication information sent by the network device, and the second new data indication information indicates whether the second data packet is an initially transmitted data packet or a retransmitted data packet; and
performing, by the terminal device, buffering processing on the first data packet or sending the second data packet, wherein which of the buffering processing on the first data packet or the sending of the second data packet is performed is based on a value of the first new data indication information and a value of the second new data indication information, and based on determining whether a transport block size (TBS) corresponding to the first data packet is the same size as a TBS corresponding to the second data packet scheduled by the first instruction information, and wherein the second data packet is a retransmitted data packet of the first data packet, or the second data packet is an initially transmitted data packet different from the first data packet.

2. The method according to claim 1, wherein sending, by the terminal device, the second data packet based on the value of the first new data indication information and the value of the second new data indication information, and based on determining whether the size of the TBS corresponding to the first data packet is the same size as the TBS corresponding to the second data packet scheduled by the first instruction information, comprises:
sending, by the terminal device, the second data packet in the second time unit according to the first instruction information in response to the value of the first new data indication information being the same as the value of the second new data indication information and in response to determining that the TBS corresponding to the first data packet is the same as size as the TBS corresponding to the second data packet scheduled by the first instruction information, wherein the second data packet is a retransmitted data packet of the first data packet.

3. The method according to claim 1, further comprising:
ignoring, by the terminal device, the first instruction information in response to the value of the first new data indication information being the same as the value of the second new data indication information and in response to determining that the TBS corresponding to the first data packet is a different size than the TBS corresponding to the second data packet scheduled by the first instruction information.

4. The method according to claim 1, wherein sending, by the terminal device, the second data packet based on the value of the first new data indication information and the value of the second new data indication information comprises:
sending, by the terminal device, the second data packet in the second time unit according to the first instruction information in response to the value of the first new data indication information being different from the value of the second new data indication information, wherein the second data packet is an initially transmitted data packet that is different than the first data packet.

5. The method according to claim 1, further comprising:
determining, by the terminal device, the value of the first new data indication information based on a transmission relationship between a third data packet and the first data packet and a value of third new data indication information corresponding to the third data packet, wherein the transmission relationship comprises:
the third data packet being an initially transmitted data packet different from the first data packet; or
the third data packet being a retransmitted data packet of the first data packet; and
wherein the third new data indication information indicates whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in time.

6. The method according to claim 1, further comprising:
receiving, by the terminal device, control information sent by the network device, wherein the control information comprises fourth new data indication information, and a value of the fourth new data indication information is a first preset value when the control information activates or reactivates the terminal device to send information in the GUL transmission manner; and
determining, by the terminal device based on the control information, a semi-persistent time domain resource corresponding to the GUL transmission manner, wherein the first time unit belongs to the semi-persistent time domain resource.

7. A terminal device, comprising:
a processor; and
a non-transitory computer-readable storage medium coupled to the processor and storing programming instructions for execution by the processor, the programming including instructions that instruct the processor to:
send grant free uplink control information (G-UCI), wherein the G-UCI includes a first new data indication information;
send a first data packet to a network device in a first time unit in a grant free uplink (GUL) transmission manner, wherein the first data packet corresponds to a first hybrid automatic repeat request (HARQ) process number, the first data packet corresponds to the first new data indication information, and the first new data indication information indicates whether the first data packet is an initially transmitted data packet or a retransmitted data packet; and
receive first instruction information sent by the network device, wherein the first instruction information instructs the terminal device to send a second data packet in a second time unit, the second data packet corresponds to the first HARQ process number, the second time unit is located after the first time unit in time, the second data packet corresponds to second new data indication information sent by the network device, and the second new data indication information indicates whether the second data packet is an initially transmitted data packet or a retransmitted data packet; and
perform buffering processing on the first data packet or send the second data packet, wherein the buffering processing or the sending of the second data packet is performed based on a value of the first new data indication information and a value of the second new data indication information, and based on determining whether a transport block size (TBS) corresponding to the first data packet is the same size as a TBS corresponding to the second data packet scheduled by the first instruction information, wherein the second data packet is a retransmitted data packet of the first data packet, or the second data packet is an initially transmitted data packet that is different from the first data packet.

8. The terminal device according to claim 7, wherein the programming includes instructions that instruct the processor to:
send the second data packet in the second time unit according to the first instruction information in response to the value of the first new data indication information being the same as the value of the second new data indication information and in response to determining that the TBS corresponding to the first data packet is the same size as the TBS corresponding to the second data packet scheduled by the first instruction information, wherein the second data packet is a retransmitted data packet of the first data packet.

9. The terminal device according to claim 7, wherein the programming further includes instructions that instruct the processor to:
ignore the first instruction information in response to the value of the first new data indication information being the same as the value of the second new data indication information and in response to determining that the TBS corresponding to the first data packet is a different size than the TBS corresponding to the second data packet scheduled by the first instruction information.

10. The terminal device according to claim 7, wherein the programming includes instructions that instruct the processor to:
send the second data packet in the second time unit according to the first instruction information in response to the value of the first new data indication information being different from the value of the second new data indication information, wherein the second data packet is an initially transmitted data packet different from the first data packet.

11. The terminal device according to claim 7, wherein the programming further includes instructions that instruct the processor to:
determine the value of the first new data indication information based on a transmission relationship between a third data packet and the first data packet and a value of third new data indication information corresponding to the third data packet, wherein the transmission relationship comprises:
the third data packet being an initially transmitted data packet different from the first data packet; or
the third data packet being a retransmitted data packet of the first data packet; and
wherein the third new data indication information indicates whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in time.

12. The terminal device according to claim 7, wherein the programming further includes instructions that instruct the processor to:
receive control information sent by the network device, wherein the control information comprises fourth new data indication information, and a value of the fourth new data indication information is a first preset value when the control information activates or reactivates the terminal device to send information in the GUL transmission manner; and
determine, based on the control information, a semi-persistent time domain resource corresponding to the GUL transmission manner, wherein the first time unit belongs to the semi-persistent time domain resource.

13. A method, comprising:
sending, by a network device, first instruction information to a terminal device, wherein the first instruction information instructs the terminal device to send a second data packet in a second time unit, the second data packet corresponds to a first hybrid automatic repeat request (HARQ) process number, the second data packet corresponds to second new data indication information sent by the network device to the terminal device, the second new data indication information indicates whether the second data packet is an initially transmitted data packet or a retransmitted data packet, the first HARQ process number further corresponds to a first data packet, the first data packet is sent by the terminal device to the network device in a first time unit in a grant free uplink (GUL) transmission manner, the first data packet corresponds to first new data indication information received by the network device from the terminal device, the first new data indication information indicates whether the first data packet is an initially transmitted data packet or a retransmitted data packet, and the second time unit is located after the first time unit in time; and
receiving, by the network device, the second data packet sent by the terminal device, wherein the second data packet is a retransmitted data packet of the first data packet, or the second data packet is an initially transmitted data packet that is different from the first data packet, and whether the second data packet is the retransmitted data packet of the first data packet or the initially transmitted data packet is based on a value of the first new data indication information and a value of the second new data indication information, and based on a determination of whether a transport block size (TBS) corresponding to the first data packet is the same size as the TBS corresponding to the second data packet scheduled by the first instruction information.

14. The method according to claim 13, wherein when the value of the first new data indication information is the same as the value of the second new data indication information, and when the TBS corresponding to the first data packet is determined to be the same size as the TBS corresponding to the second data packet, the second data packet is a retransmitted data packet of the first data packet.

15. The method according to claim 13, wherein the second data packet is an initially transmitted data packet that is different from the first data packet when a value of the first new data indication information is different from a value of the second new data indication information.

16. The method according to claim 13, wherein:
when the first data packet is a retransmitted data packet of a third data packet, the value of the first new data indication information is the same as a value of third new data indication information corresponding to the third data packet, wherein the third new data indication information indicates whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in time; or
when the first data packet is an initially transmitted data packet different from the third data packet, the value of the first new data indication information is different from the value of the third new data indication information corresponding to the third data packet, wherein the third new data indication information indicates whether the third data packet is an initially transmitted data packet or a retransmitted data packet, the third data packet is a data packet that the network device schedules the terminal device to send in the third time unit, the third data packet corresponds to the first HARQ process number, and the third time unit is located before the first time unit in time.

17. The method according to claim 13, further comprising:
sending, by the network device, control information to the terminal device, wherein the control information comprises fourth new data indication information, a value of the fourth new data indication information is a first preset value when the control information activates or reactivates the terminal device to send information in the GUL transmission manner, and the first time unit belongs to a semi-persistent time domain resource corresponding to the GUL transmission manner.

18. A network device, comprising:
a processor; and
a non-transitory computer-readable storage medium coupled to the processor and storing programming instructions for execution a program to be executed by the processor, the programming program including instructions instruct the processor to:
send first instruction information to a terminal device, wherein the first instruction information instructs the terminal device to send a second data packet in a second time unit, the second data packet corresponds to a first hybrid automatic repeat request (HARQ) process number, the second data packet corresponds to second new data indication information sent by the network device to the terminal device, the second new data indication information indicates whether the second data packet is an initially transmitted data packet or a retransmitted data packet, the first HARQ process number further corresponds to a first data packet, the first data packet is sent by the terminal device to the network device in a first time unit in a grant free uplink (GUL) transmission manner, the first data packet corresponds to first new data indication information received from the terminal device, the first new data indication information indicates whether the first data packet is an initially transmitted data packet or a retransmitted data packet, and the second time unit is located after the first time unit in time; and
receive the second data packet sent by the terminal device, wherein the second data packet is a retransmitted data packet of the first data packet, or the second data packet is an initially transmitted data packet different from the first data packet, and whether the second data packet is the retransmitted data packet of the first data packet or the initially transmitted data packet is based on a value of the first new data indication information and a value of the second new data indication information, and based on a determination of whether a transport block size (TBS) corresponding to the first data packet is the same size as the TBS corresponding to the second data packet scheduled by the first instruction information.

19. The network device according to claim 18, wherein when a value of the first new data indication information is the same as a value of the second new data indication information and when it is determined that the TBS corresponding to the first data packet is the same size as the TBS corresponding to the second data packet, the second data packet is a data packet sent by the terminal device in the second time unit.

20. The network device according to claim 18, wherein the second data packet is an initially transmitted data packet different from the first data packet when a value of the first new data indication information is different from a value of the second new data indication information.

21. The network device according to claim 18, wherein:
when the first data packet is a retransmitted data packet of a third data packet, the value of the first new data indication information is the same as a value of third new data indication information corresponding to the third data packet, wherein the third new data indication information indicates whether the third data packet is an initially transmitted data packet or a retransmitted data packet, the third data packet is a data packet that the network device schedules the terminal device to send in a third time unit, the third data packet corresponds to the first HARQ process number, and the third time unit is located before the first time unit in time; or
when the first data packet is an initially transmitted data packet different from the third data packet, the value of the first new data indication information is different from the value of the third new data indication information corresponding to the third data packet, wherein the third new data indication information indicates whether the third data packet is an initially transmitted data packet or a retransmitted data packet, the third data packet is a data packet that the terminal device schedules the terminal device to send in the third time unit, the third data packet corresponds to the first HARQ process number, and the third time unit is located before the first time unit in time.

22. The network device according to claim 18, wherein the programming further includes instructions that instruct the processor to:
send control information to the terminal device, wherein the control information comprises fourth new data indication information, a value of the fourth new data indication information is a first preset value when the control information activate or reactivate the terminal device to send information in the GUL transmission manner, and the first time unit belongs to a semi-persistent time domain resource corresponding to the GUL transmission manner.

* * * * *